(12) United States Patent
Marron

(10) Patent No.: US 8,227,735 B1
(45) Date of Patent: Jul. 24, 2012

(54) COMBINED ACTIVE AND PASSIVE IMAGING SYSTEM WITH RADIATION SOURCE UNIT AND DETECTOR

(75) Inventor: Joseph C. Marron, Pittsford, NY (US)

(73) Assignee: Lockheed Martin Coherent Technologies, Inc., Louisville, CO (US)

( * ) Notice: Subject to any disclaimer, the term of this patent is extended or adjusted under 35 U.S.C. 154(b) by 591 days.

(21) Appl. No.: 12/390,380

(22) Filed: Feb. 20, 2009

Related U.S. Application Data

(63) Continuation-in-part of application No. 11/878,367, filed on Jul. 24, 2007, now Pat. No. 8,068,235.

(51) Int. Cl.
*H01L 27/00* (2006.01)
*G06M 7/00* (2006.01)
*H05B 37/02* (2006.01)

(52) U.S. Cl. .............. 250/208.1; 250/221; 250/214 AL

(58) Field of Classification Search .............. 250/208.1, 250/221, 216, 214 AL; 356/450, 451, 456, 356/457, 484, 458, 3, 4.01; 372/109, 9
See application file for complete search history.

(56) References Cited

U.S. PATENT DOCUMENTS

| | | | |
|---|---|---|---|
| 4,498,773 | A | 2/1985 | von Bieren |
| 6,137,574 | A | 10/2000 | Hill |
| 7,057,738 | B2 | 6/2006 | Millerd et al. |
| 7,283,248 | B2 | 10/2007 | Hill |
| 7,372,575 | B2 * | 5/2008 | Fujita ............. 356/479 |
| 7,405,834 | B1 | 7/2008 | Marron et al. |
| 2003/0128368 | A1 | 7/2003 | Kuchel |
| 2005/0146727 | A1 | 7/2005 | Hill |
| 2006/0004292 | A1 * | 1/2006 | Beylin .............. 600/476 |

OTHER PUBLICATIONS

Marron et al.; Three-Dimensional Imaging Using a Tunable Laser Source; Optical Engineering; Jan. 2000; pp. 47-51; vol. 39, No. 1; Society of Photo-Optical Instrumentation Engineers.
Wyant; Testing Aspherics Using Two-Wavelength Holography; Applied Optics; Sep. 1971; pp. 2113-2118; vol. 10, No. 9.
Wyant et al.; Testing Aspherics Using Two-Wavelength Holography: Use of Digital Electronic Techniques; Applied Optics; Nov. 15, 1984; pp. 4020-4023; vol. 23, No. 22.
Marron et al.; Three-dimensional Lensless Imaging Using Laser Frequency Diversity; Applied Optics; Jan. 10, 1992; pp. 255-262; vol. 31, No. 2.
Paxman et al.; Aberration Correction of Speckled Imagery With an Image-Sharpness Criterion; SPIE vol. 976 Statistaical Optics; 1988; pp. 37-47.

* cited by examiner

*Primary Examiner* — Pascal M Bui Pho
(74) *Attorney, Agent, or Firm* — McDermott, Will & Emery, LLP

(57) ABSTRACT

A combined active and passive imaging system comprises a radiation source unit configured to output a radiation beam towards a detector and an object in a scene. The system further comprises the detector configured to record a first instance of an intensity pattern of an interference between at least a portion of the radiation beam and at least a portion of a return radiation from the object. The detector may further be configured to record ambient light reflected from the scene. The detector may output a first signal with the recorded ambient light reflected from the scene and a second signal with the recorded intensity pattern. The system further comprises a processor communicatively coupled to the detector and the radiation source unit. The processor may receive the first signal and the second signal and select the object in the scene.

15 Claims, 18 Drawing Sheets

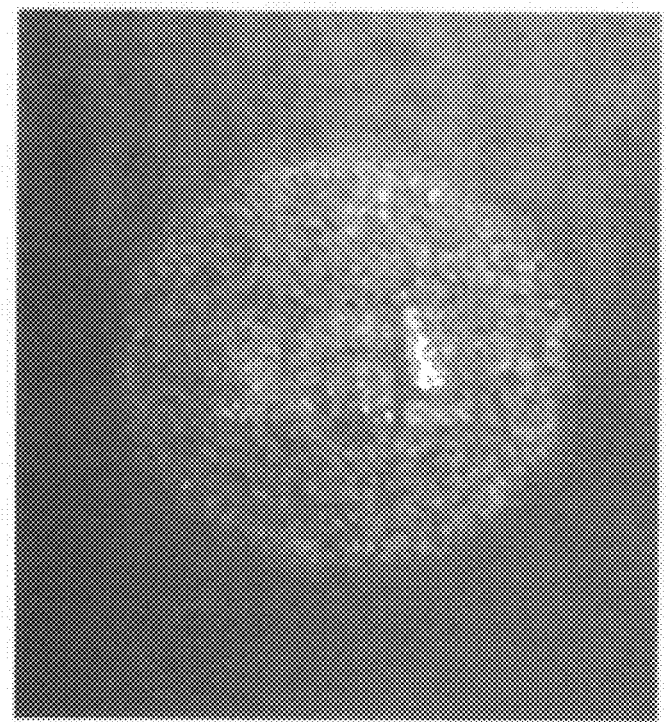
Figure 7B
Figure 7A

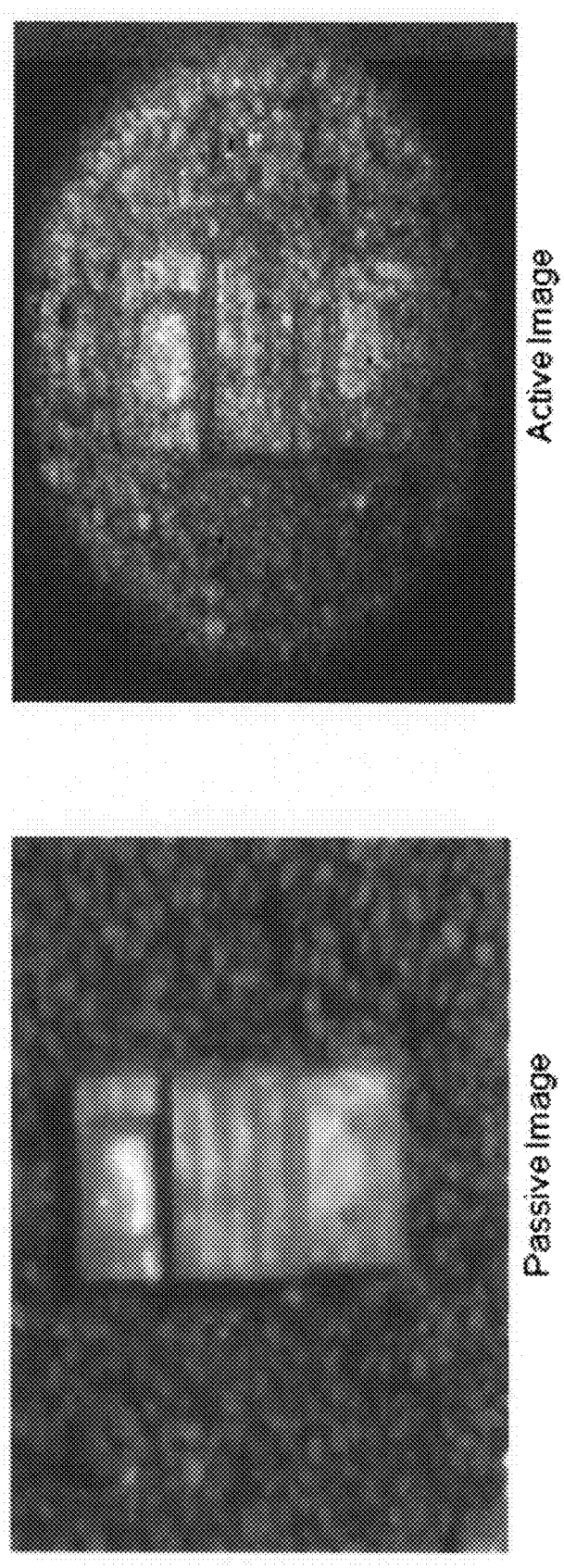

Color Encoded 3D Image

Passive Image

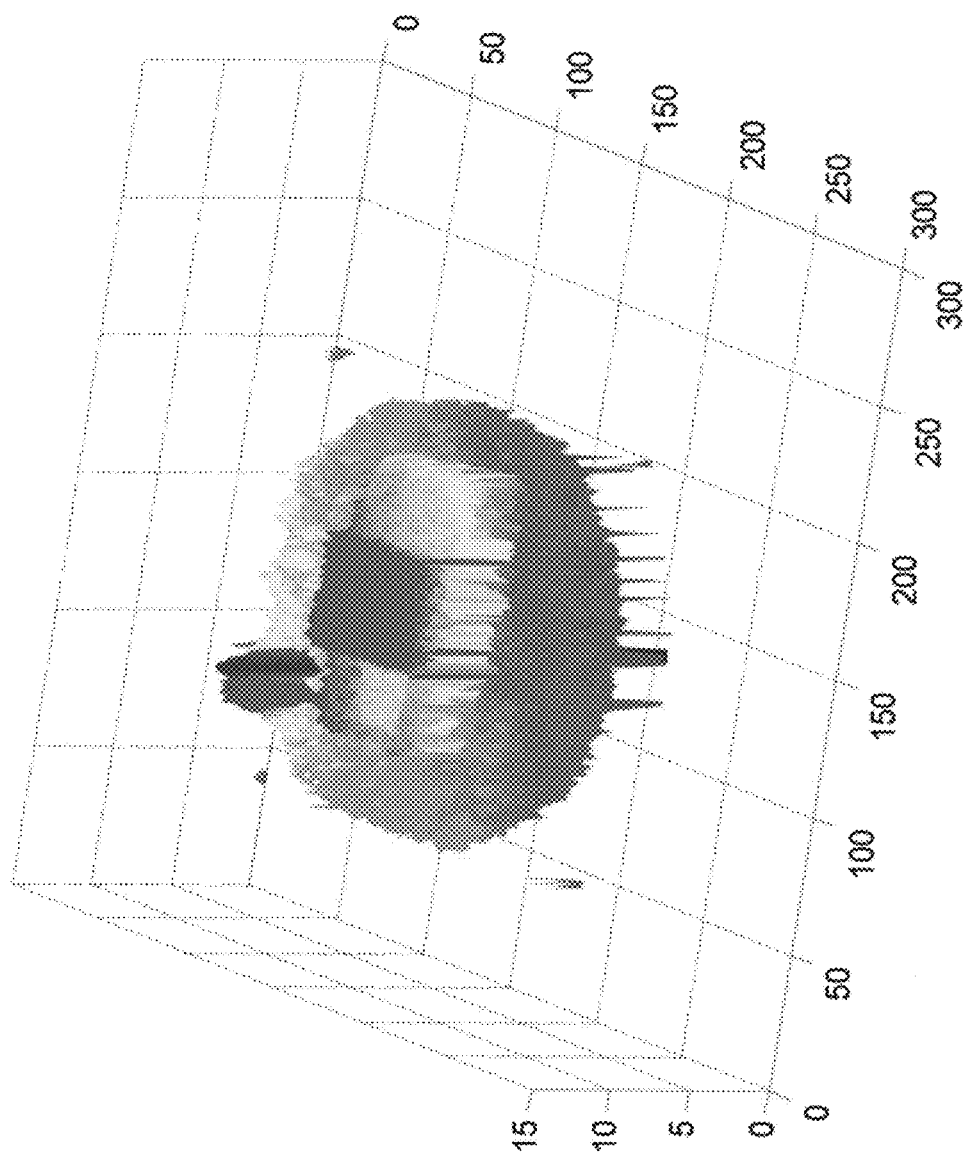

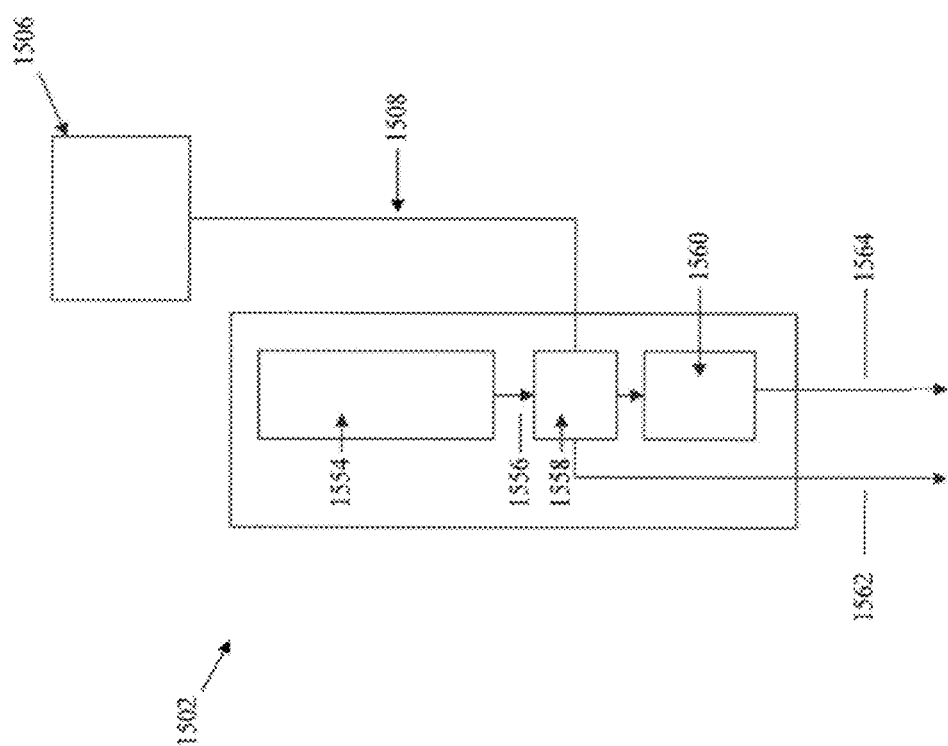

COMBINED ACTIVE AND PASSIVE IMAGING SYSTEM WITH RADIATION SOURCE UNIT AND DETECTOR

CROSS-REFERENCES TO RELATED APPLICATIONS

This application is a continuation-in-part of U.S. patent application Ser. No. 11/878,367 entitled "Systems and Methods for Multi-Function Coherent Imaging", filed Jul. 24, 2007, incorporated herein by reference in its entirety for all purposes.

STATEMENT AS TO RIGHTS TO INVENTIONS MADE UNDER FEDERALLY SPONSORED RESEARCH OR DEVELOPMENT

Not Applicable.

FIELD

The present invention generally relates to imaging systems and, in particular, relates to combined active and passive imaging systems.

BACKGROUND

In the field of laser remote sensing, it is desirable to have a sensor for which the object is flood-illuminated with a laser pulse and the reflected light is detected by an array of detectors located in the image plane of an optical system. With such a sensor, the requirement for large aperture scanning optics typically associated with laser remote sensing systems is eliminated. However, such a sensor typically requires a high-speed detector array that is synchronized with the laser pulse. This type of detector array typically has a limited number of pixels, is costly to manufacture and is generally not optimal for passive imaging. Additionally, one approach for recording active images with flood illumination of the object requires digital holographic detection in the pupil plane of the optical system. The problem with this approach is that because the detector is located in the pupil plane, it precludes the possibility of also performing passive imaging in the image plane with the same detector array. Thus, separate detector arrays would be required if both active imaging and passive imaging are desired.

SUMMARY

In accordance with one aspect of the present invention, an imaging system is provided that includes passive (ambient illumination) and active (laser illumination) imaging capability using the same detector array. For passive imaging, the imaging system can collect ambient light reflected from a scene and focus an image onto a detector array, in accordance with one aspect of the present invention. The array can then be read out and digitized to form a digital representation of the passive image of the scene. For active imaging, a portion of the scene can be flood illuminated with laser light and an active image can be recorded, in accordance with another aspect of the present invention. Specifically, the active image can be recorded using image-plane digital holographic detection that gives a complex-valued coherent image of the illuminated region. With complex-valued coherent images recorded for multiple discriminants, advanced imaging functions such as three-dimensional (3D) imaging may be performed. According to one aspect of the present invention, an operator can use the passive image to queue a sensor system to form a 3D active image of a desired scene portion.

An exemplary embodiment relates to a combined active and passive imaging system, comprising a first radiation source unit. The first radiation source unit comprises a first coherent radiation source configured to output a first radiation beam. The first radiation source unit further comprises one or more first optical components configured to direct at least a portion of the first radiation beam towards a first detector. The first radiation source unit further comprises one or more second optical components configured to direct the first radiation beam towards an object in a first scene, wherein the first scene is larger than the object. The system further comprises the first detector configured to record a first instance of a first intensity pattern of a first interference between at least a portion of the first radiation beam and at least a portion of a first return radiation from the object. The first detector may further be configured to record ambient light reflected from the first scene. The first detector may further be configured to output a first signal with the recorded ambient light reflected from the first scene and a second signal with the recorded first intensity pattern.

The system further comprises a processor communicatively coupled to the first detector and the first radiation source unit. The processor may further be configured to receive the first signal and the second signal. The processor may further be configured to select the object in the first scene.

Another exemplary embodiment relates to a combined active and passive imaging system, comprising a first radiation source unit. The first radiation source unit comprises a first coherent radiation source configured to output a first radiation beam, and a second coherent radiation source configured to output a second radiation beam. The first radiation source unit further comprises one or more first optical components configured to direct at least a portion of the first radiation beam and at least a portion of the second radiation beam towards a first detector, wherein at least a portion of second radiation beam is spatially offset, angularly offset, or spatially and angularly offset from at least a portion of the first radiation beam.

The first radiation source unit further comprises one or more second optical components configured to combine at least a portion of the first radiation beam and at least a portion of the second radiation beam to form a first flood beam, wherein the one or more second optical components are further configured to direct the first flood beam towards an object in a first scene, wherein the first scene is larger than the object. The exemplary system further comprises the first detector configured to simultaneously record a first instance of a first superposition of a first intensity pattern of a first interference between at least a portion of the first radiation beam and at least a portion of a first return radiation from the object, and a second intensity pattern of a second interference between at least a portion of second radiation beam and at least a portion of the first return radiation from the object. The first detector may be further configured to record ambient light reflected from the first scene. The first detector may be further configured to output a first signal with the recorded ambient light reflected from the first scene and a second signal with the recorded first superposition.

The exemplary system further comprises a processor communicatively coupled to the first detector and the first radiation source unit, wherein the processor is configured to receive the first signal and the second signal, and wherein the processor is further configured to select the object in the first scene.

Another exemplary embodiment relates to a combined active and passive imaging system, comprising a first coherent radiation source comprising a first master oscillator configured to output a first radiation beam. The first coherent radiation source also comprises a first slave device configured to pulse the first radiation beam so as to output a first pulsed radiation beam coherent with the first radiation beam towards an object in a first scene, wherein the first scene is larger than the object. The first coherent radiation source also comprises a first optical switch configured to gate at least a portion of the first radiation beam such that at least a portion of the first radiation beam radiates a first detector during a temporal period when at least a portion of return radiation is returning from the object.

The exemplary system further comprises a second coherent radiation source comprising a second master oscillator configured to output a second radiation beam. The second coherent radiation source also has a second slave device configured to pulse the second radiation beam so as to output a second pulsed radiation beam coherent with the second radiation beam towards the object in the first scene. The second coherent radiation source also comprises a second optical switch configured to gate at least a portion of the second radiation beam such that at least a portion of the second radiation beam radiates the first detector during a temporal period when at least a portion of the return radiation is returning from the object. The exemplary system further comprises the first detector configured to simultaneously record a first instance of a first superposition of a first intensity pattern of a first interference between at least a portion of the first radiation beam and at least a portion of the return radiation from the object, and a second intensity pattern of a second interference between at least a portion of the second radiation beam and at least a portion of the return radiation from the object. The first detector may be further configured to record ambient light reflected from the first scene. The first detector may be further configured to output a first signal with the recorded ambient light reflected from the first scene and a second signal with the recorded first superposition.

The exemplary system further comprises a processor communicatively coupled to the first detector, the first coherent radiation source, and the second coherent radiation source, wherein the processor is configured to receive the first signal and the second signal. The processor may be further configured to select the object in the first scene.

Additional features and advantages of the invention will be set forth in the description below, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate aspects of the invention and together with the description serve to explain the principles of the invention.

FIGS. 7A and 7B illustrate small image regions (image chips) corresponding to passive and active images in the boxed regions in FIG. 6, in accordance with one embodiment of the present invention.

FIGS. 10A and 10B illustrate processed passive and active images, and the sum of the intensity images at wavelengths $\lambda_1$ and $\lambda_2$ is shown in FIG. 10B, in accordance with one embodiment of the present invention.

FIG. 12 illustrates the 3D image shown in FIG. 11B viewed in perspective, in accordance with one embodiment of the present invention.

FIG. 15 illustrates an exemplary coherent radiation source, in accordance with one embodiment of the present invention.

DETAILED DESCRIPTION

Figure 1A:
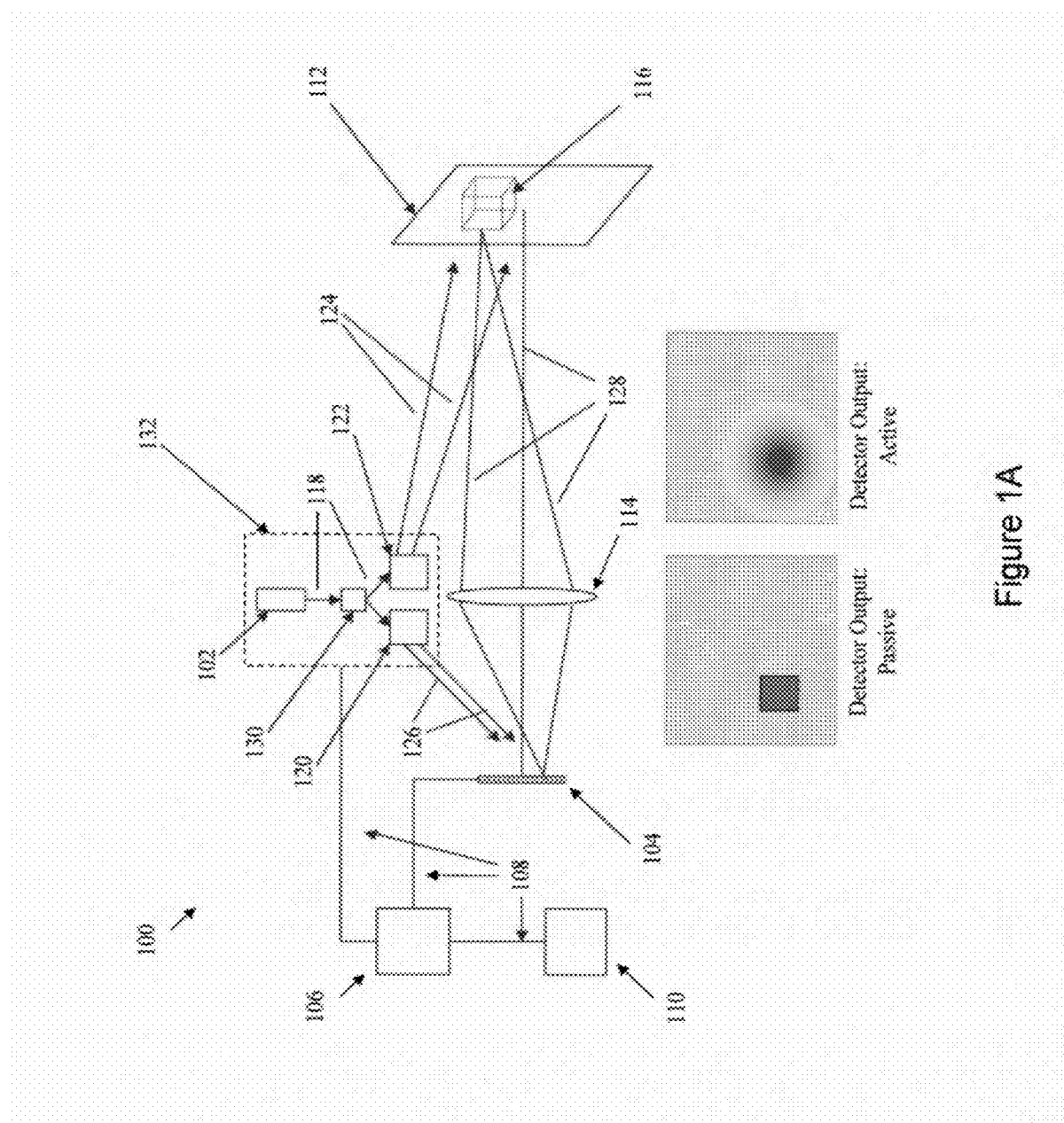
FIGS. 1A and 1B illustrate imaging systems that combine passive and active imaging functions, with FIG. 1A illustrating the imaging system with one coherent radiation source and FIG. 1B illustrating the imaging system with multiple coherent radiation sources, in accordance with one embodiment of the present invention.

In the following detailed description, numerous specific details are set forth to provide a full understanding of the present invention. It will be obvious, however, to one ordinarily skilled in the art that the present invention may be practiced without some of these specific details. In other instances, well-known structures and techniques have not been shown in detail so as not to obscure the present invention. Like components are labeled with similar element numbers for ease of understanding.

In accordance with one embodiment of the present invention, an imaging system is provided that includes both passive (ambient illumination) imaging capability as well as active (laser illumination) imaging capability using the same detector array. For the passive imaging mode, the imaging system can collect ambient light reflected from a scene and focus an image onto a detector array. The array can then be read out and digitized to form a digital representation of the passive image of the scene. An object in the scene may be selected for active imaging, wherein the scene is larger than the object. For example, the scene may be at least 2× larger than the object. For the active imaging mode, a portion of the scene, such as the object, can be flood illuminated with laser light and an active image can be recorded. Specifically, the active image can be recorded using digital holographic detection that gives a complex-valued coherent image of the illuminated region. With complex-valued coherent images recorded for multiple discriminants, such as closely spaced wavelengths, advanced imaging functions such as 3D imaging may be performed. Multi-function coherent imaging is described in U.S. patent application Ser. No. 11/878,367, which is hereby incorporated by reference in its entirety.

Various aspects of the present invention include passive and active imaging being performed on the same detector array, avoiding the need for having a separate high-speed detection system employed for 3D active imaging. In addition, the 3D images and passive images can be spatially registered, which allows the formation of advanced image products such as 3D active images draped with passive images. Another aspect of the present invention is that an operator can use the passive image to queue a sensor system to form a 3D active image of a desired scene portion. Active imaging also enables other image functions such as object motion sensing, turbulence correction, or complex-valued polarization analysis.

As stated above, one aspect of the present invention involves using the digital representation of the scene obtained by passive imaging to select areas of interest that warrant closer analysis via active imaging discriminants such as 3D imaging. While active imaging offers significant features for scene analysis, the size of area of interest selected for active interrogation can be limited by the laser's power. The size of the area illuminated can effectively be increased by combining a series of active images where a series of small regions are illuminated with, for example, a series of laser pulses where the region being illuminated is varied using a scanning laser flood beam.

In FIG. 1A, imaging system 100 is shown with one coherent radiation source 102. Coherent radiation source 102 may be, for example, gas lasers, solid state lasers, semiconductor lasers, fiber lasers, or any other suitable coherent radiation sources. Coherent radiation source 102 may output coherent radiation, such as radiation beam 118, to splitter 130, which may direct the coherent radiation to either reference beam illuminator 120, scannable flood illuminator 122, or both. Coherent radiation source 102 may output coherent radiation that is pulsed, for example, in a similar manner to the pulsed system described in connection with FIGS. 13 and 14 below. Splitter 130, reference beam illuminator 120 and scannable flood illuminator 122 may be lens systems with optical components configured to combine, direct, or combine and direct radiation beam 118 at different angles. These optical components may include polarizing mirrors, beamsplitters, beam steering devices or any other suitable optical components.

In one embodiment of the present invention, reference beam illuminator 120 may direct radiation beam 118 at and radiate detector 104 as reference beam 126. Reference beam 126 may comprise multiple beams and may be spatially offset, angularly offset, or spatially and angularly offset from each other. In one embodiment of the present invention, scannable flood illuminator 122 may use radiation beam 118 to flood illuminate object 116 as flood beam 124. Radiation scattered from object 116 (i.e. return radiation 128) may propagate to detector 104. This active flood illumination may encompass several resolution cells in a scannable region and thus may emanate from a separate, scannable optical system, such as scannable flood illuminator 122, that has an aperture that may be smaller than the imaging system. Having small components associated with scanning may be desirable; imaging system 100 may accomplish this by flood illuminating scene 112 rather than illuminating scene 112 with a small beam of light as done in other scanning laser radar systems. Radiation source unit 132 may comprise coherent radiation source 102, splitter 130, reference beam illuminator 120, and scannable flood illuminator 122. Radiation source unit 132 may be communicatively coupled to processor 106 via communicative coupling 108 or any other suitable communication medium.

It is to be understood that imaging system 100 may include one or a plurality of coherent radiation sources. For example in FIG. 1B, imaging system 100 is shown with multiple coherent radiation sources 102a and 12b. Coherent radiation sources 102a and 102b may output coherent radiation (i.e. radiation beams 118a and 118b) with one or more wavelengths, one or more polarization states, or one or more wavelengths and polarization states. Coherent radiation sources 102a and 102b may direct radiation beams, such as radiation beams 118a and 118b, to splitter 130. Each radiation beam may have a distinct wavelength, range of wavelengths, output spectrum, polarization, or any combination thereof. Splitter 130, for example, may direct radiation beams 118a and 118b to reference beam illuminator 120, and may also direct radiation beams 118a and 118b to scannable flood illuminator 122. Reference beam illuminator 120 may direct radiation beams 118a and 118b at and radiate detector 104 as reference beams 126a and 126b. The reference beams may comprise multiple beams and may be spatially offset, angularly offset, or spatially and angularly offset from each other. Scannable flood illuminator 122 may combine radiation beams 118a and 118b to flood illuminate object 116 as flood beam 124. Radiation scattered from object 116 (i.e. return radiation 128) may propagate to detector 104.

Figure 1B:
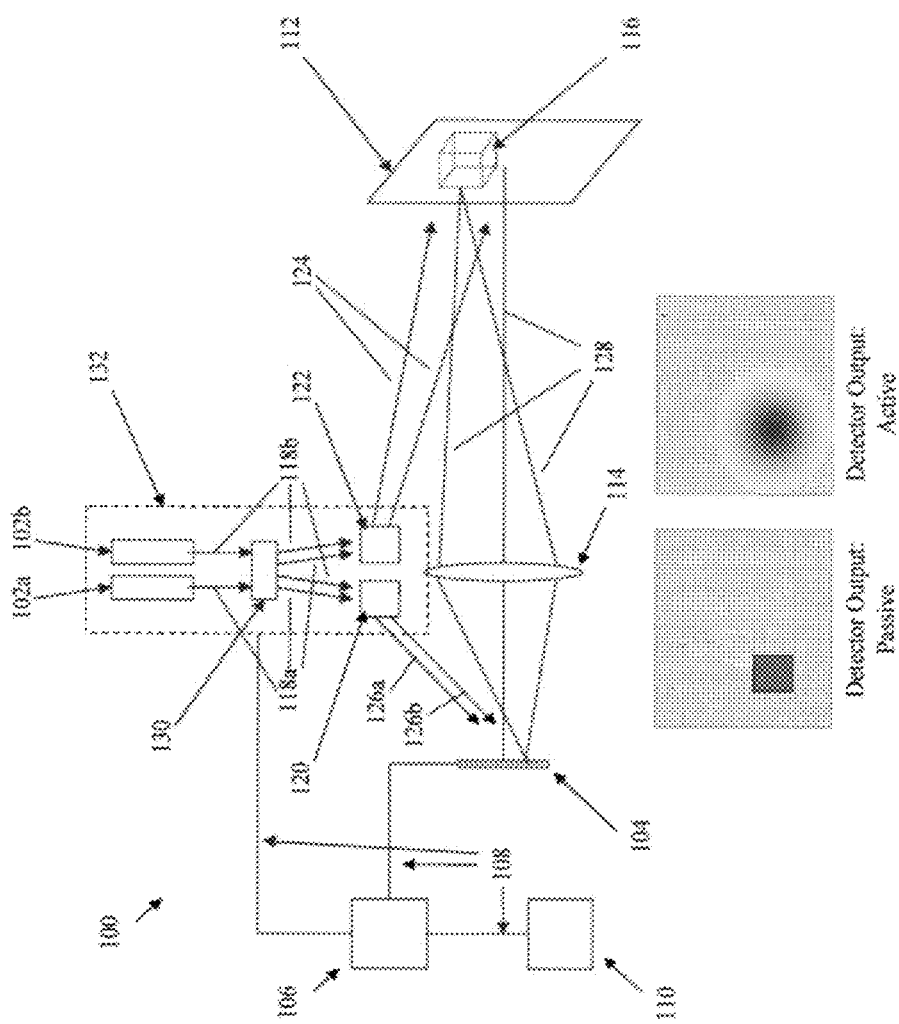

In the passive mode, coherent radiation sources 102 may be deactivated and scene 112 is ambiently illuminated and passively imaged onto detector 104 by imaging system 100; for simplicity, imaging system 100 is shown as a simple lens 114 in FIGS. 1A and 1B. For example, simple lens 114 may comprise one or more lenses, and may first focus the ambient light reflected from scene 112 onto the image plane, such as at detector 104, and not first onto a pupil plane. Detector 104 may be any suitable imaging detector, imaging detector array, or imaging sensor. For example, detector 104 may be a low speed, large format detector array, like a megapixel camera, instead of an expensive high speed, low format detector array used for other laser radar systems, which may for example only cover 8×8 pixels. The signals, such as the passive image, recorded by detector 104 may be transmitted to processor 106 via communicative coupling 108 or any other suitable communication medium. Processor 106 can be configured to select object 116 in scene 112.

User interface 110 allows a user to operate imaging system 100. For example, user interface 110 may comprise a monitor and a keyboard or mouse. In another embodiment, user interface 110 may be a touch screen monitor. User interface 110 can be any suitable device to enable a user to operate imaging system 100. User interface 110 may transmit signals to or receive signals from processor 106 via communicative coupling 108. For example, user interface 110 may display both passive and active images in response to receiving the signals from detector 104 via processor 106 and communicative coupling 108.

A user may select an object 116 (raised rectangle for example) of the passive image for further interrogation. For example, a user may be able to view a passive image of scene 112 recorded by detector 104 and displayed on user interface 110. The user may select a certain region, such as object 116, for active imaging or tracking, and this selection may be transmitted to processor 106 in the form of a signal for processing. Processor 106 may then be configured to control radiation source unit 132 in response to selecting object 116 in scene 112. For example, processor 106 may transmit signals to or receive signals from radiation source unit 132 via communicative coupling 108 to activate coherent radiation sources 102 and direct reference beams 126 and flood beam 124 accordingly. Radiation source unit 132 may be configured to locate object 116 and direct flood beam 124 towards object 116 for active imaging or tracking.

Active, coherent images may be recorded using image plane digital holographic detection. For example, the image of object 116 from return radiation 128 may be focused first onto the image plane, such as at detector 104, and not first onto a pupil plane. In an exemplary operation using only one coherent radiation source, as shown in FIG. 1A, radiation beam 118 is directed to detector 104 as reference beam 126 and radiation beam 118 is also directed at object 116 as flood beam 124. Detector 104 records the interference pattern of return radiation 128 with reference beam 126. Radiation from the scene may be manifested as a speckle pattern because it is diffusely reflected from object 116. When the speckled image is interfered with the reference beam, the coherent image may be modulated by a spatial carrier frequency. The intensity of the interference pattern is recorded by detector 104. The active image in FIG. 1A is thus shown as a speckled region. In one aspect of the present invention, processor 106 is configured to receive the passive image signal from detector 104 prior to receiving the active image signal from detector 104. However, after recording the active image, processor 106 may be further configured to select another object in scene 112 for active imaging.

Note that the active imaging may be formed using a pulsed radiation source. This is done to freeze dynamics of the interference pattern than can result from relative motion in the system. In a preferred embodiment of the present invention, to avoid detector array saturation and excess noise, the reference beam illumination of detector 104 is only activated during the interval over which pulsed return radiation from the scene is incident on detector 104. Note also that return radiation 128 and the reference beams must interfere coherently over the duration of the received pulse. In addition, these beams should not exhibit Doppler beating over the received pulse duration; for this reason, a Doppler frequency offset can be incorporated into the reference beams to compensate for Doppler motion that can arise from fast longitudinal relative motion. The pulsed mode of operation is described in detail below.

By using pulsed illumination, a detector integration time for the active imaging may be used that is much shorter than the integration time used for passive illumination. In this manner, the contribution of the passive image to the active image may be negligible.

Now consider the process for detection of complex-valued active images using digital holographic detection. As stated above, this detected signal corresponds to the interference of the object beam (i.e., return radiation 128) and a reference beam (i.e., reference beam 126), and recording the intensity on detector 104. Mathematically this interference process can be written as $$I(m,n) = |f(m,n) + g(m,n)|^2, \quad (1)$$

where I(m, n) is the intensity of the interference pattern at pixel m, n and f and g are complex-valued, optical fields from the object and reference beams respectively, also as functions of detector pixel location. The range of values of m and n may correspond only to the section of the scene that is actively illuminated.

To simplify notation, pixel indexing can be ignored and Equation (1) can be written as $$\begin{aligned} I &= |(f+g)|^2 \\ &= |f|^2 + |g|^2 + fg^* + f^*g. \end{aligned} \quad (2)$$

Note that there are four terms in this result. Observation of experimental data shows that the result is a sinusoidally modulated image with the frequency of the sinusoid (spatial carrier frequency) corresponding to the angular offset between the object and reference beams. It follows that the Fourier transform of this recoded intensity pattern may be given by $$FT(I) = F \otimes F^* + G \otimes G^* + F \otimes G^* + F^* \otimes G, \quad (3)$$

where $\otimes$ denotes the convolution operation and F and G are the Fourier transforms of f and g respectively. Here the Fourier transform is computed digitally, for example, by processor 106, using an algorithm such as the fast Fourier transform (FFT) algorithm. If the reference beam, g, is a plane wave, it follows that the Fourier transform of the intensity pattern may be given by $$FT(I) = F \otimes F^* + \delta(x) + F(x-b) + F^*(x+b). \quad (4)$$

where the offset b corresponds to the angular offset of the reference wave or the frequency of the spatial carrier frequency. Note that F is the complex-valued field in the pupil and thus the outline, or support, of F corresponds to the shape of the lens pupil. For example, for an imaging system with a circular aperture, F thus has a circular outline.

In processing the data, the term F(x−b) can be extracted, centered, and then the inverse digital Fourier transform can be computed, for example, by processor 106. The result is f, a complex-valued, coherent image of the actively illuminated region.

Figure 2:
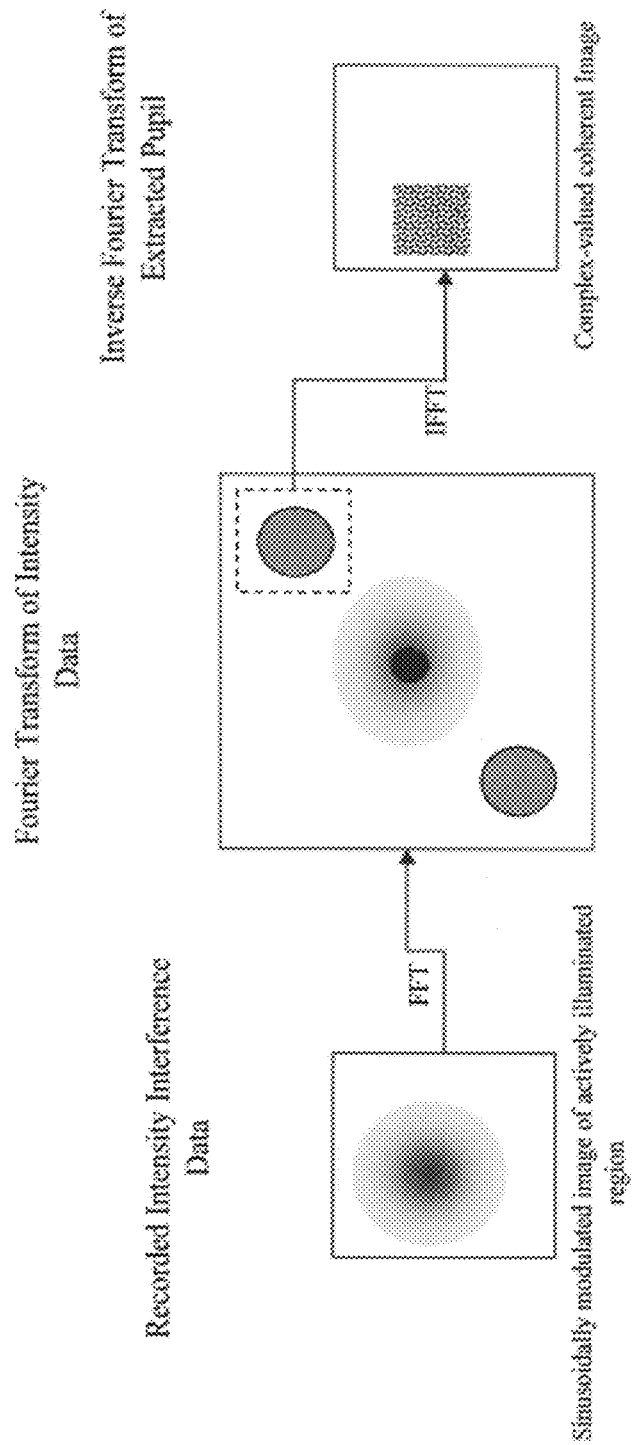
FIG. 2 is an illustration of recorded intensity data, and its Fourier transform processing, in accordance with one embodiment of the present invention.

FIG. 2 is an illustration of recorded intensity data, and its Fourier transform processing, in accordance with one embodiment of the present invention. In other words, FIG. 2 illustrates the relationship shown in Eq. (4). Note the correspondence between the terms of Eq. (4) and FIG. 2. The first term in Eq. (4) is the autocorrelation of the complex-valued lens pupil; for a circular pupil this corresponds to the central tapered disk shown in FIG. 2. The second term is a delta function at the origin that is set to zero value digitally and is thus covered by the blackened circular region in the center of FIG. 2. The final two terms are a set of twin (complex-conjugate) pupil images spatially offset from the center by ±b. These pupil images are complex-valued and by extracting one of them, for example the boxed region in FIG. 10, and centering it and computing the inverse Fourier transform, the complex-valued representation of the object field can be obtained.

It may be desirable to record additional coherent, complex-valued images. According to one approach, recording coherent images at a series of wavelengths can form a 3D image. It can also be useful to form coherent images at a series of polarizations to conduct analysis of target materials. In one approach, coherent images are formed serially in time by recording a series of frames from the detector array. One difficulty with this is that if the object moves an amount comparable to the wavelength of light between frames, the underlying serially recorded images can be decorrelated and thus coherent image analysis becomes more difficult. According to one aspect of the present invention, coherent images corresponding to different wavelengths, polarizations or other discriminants can be recorded simultaneously by using different spatial carrier frequencies for the discriminants that are being recorded. This may be accomplished by using reference beams that are incident on the detector array at different angles. An example of an imaging system that accomplishes this for two coherent images is shown in FIG. 3.

Figure 3:
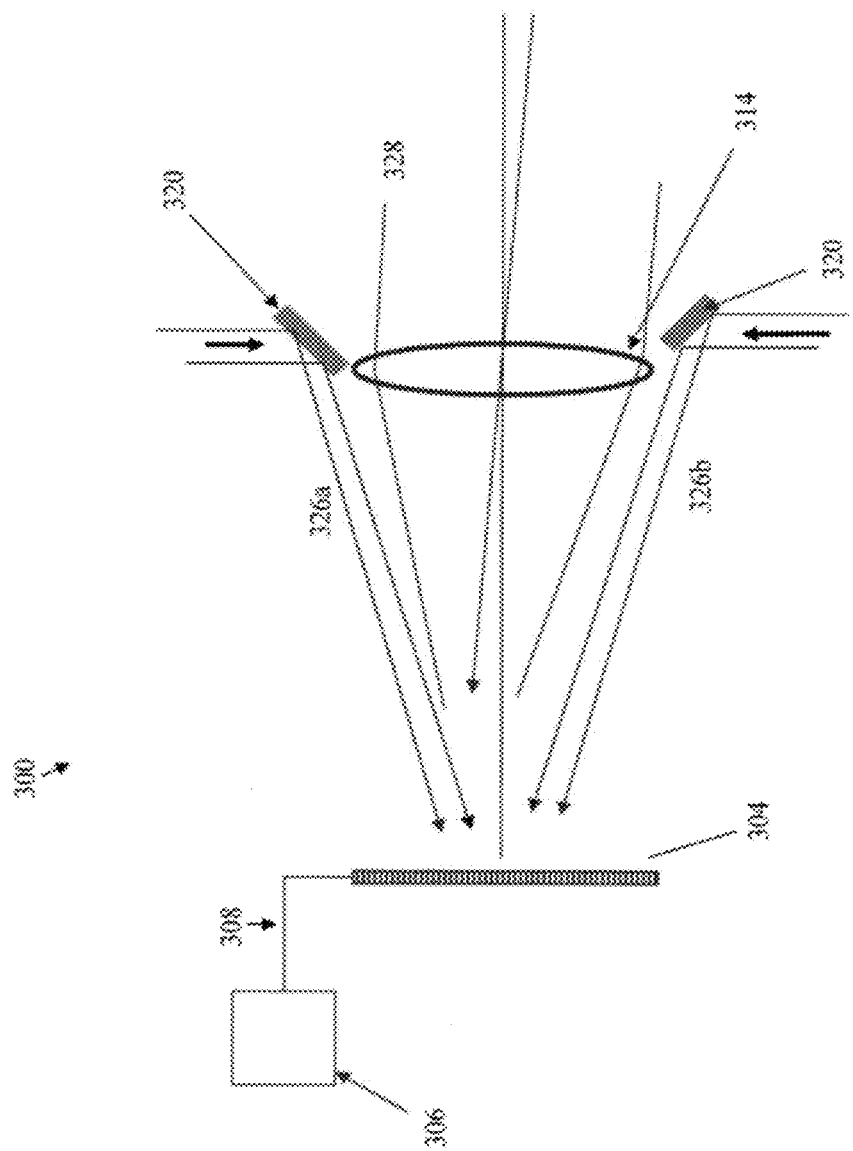
FIG. 3 illustrates image plane digital holographic detection using two spatial carrier frequencies to record two complex-valued images simultaneously, in accordance with one embodiment of the present invention.

FIG. 3 illustrates image plane digital holographic detection using two spatial carrier frequencies to record two complex-valued images simultaneously, in accordance with one embodiment of the present invention. Imaging system 300 is similar to the imaging system shown in FIG. 1B. For simplicity, imaging system 300 is shown as a simple lens 314 and the coherent radiation sources, user interface, object, and some optical components are not shown.

Radiation from the object (i.e., return radiation 328) interferes with the two reference beams (reference beams 326a and 326b) that arrive at different angles from reference beam illuminator 320, which can comprise optical components such as polarizing mirrors, beamsplitters, or any other suitable optical components. This corresponds to having two values of the offset variable b in Eq. 4. In a preferred embodiment of the present invention, consider the case where the two reference beams are not mutually coherent and thus do not interfere with each other. This can be accomplished by having the reference beans be at two separate non-interfering wavelengths (useful for 3D imaging), or two polarizations (useful for polarization analysis). For the case of pulsed illumination, the reference beams can be of the same wavelength but temporally staggered so that they are not incident at the same time on the detector array; this mode can be useful for evaluating object dynamics. For pulsed operation with a slight wavelength shift, non-interference of the reference beams is readily accomplished by having the pulse duration, or temporal integration time of the detector, be long compared to the inverse of the beat frequency between the two reference beams.

Under the condition of non-interference of the reference beams, the intensity recorded by detector 304 can be written as the superposition of two (or more) intensity patterns recorded with different spatial carrier frequencies. For example, a first intensity pattern may be formed from the interference between at least a component of return radiation 328 and reference beam 326a. A second intensity pattern may be formed from the interference between at least a component of return radiation 328 and reference beam 326b. Detector 304 may record the superposition of the first intensity pattern to the second intensity pattern. The recorded superposition of the intensity patterns by detector 304 may be digitized into an output signal, which is transmitted to processor 306 via communicative coupling 308 or any other suitable communication medium. It follows that the Fourier transform of the recorded intensity pattern can be written as $$FT\left(\sum_{n=1}^{N} I_n\right) = \sum_{n=1}^{N} (F_n \otimes F_n^* + \delta(x) + F_n(x - b_n) + F_n^*(x + b_n)), \quad (5)$$

where n is the index of the reference beam and N is the total number of reference beams. Note that a different spatial carrier frequency, b, is used for each of the intensity patterns. Given the angular offsets of the radiation beams, the component coherent images may be spatially separated and extracted for subsequent processing by processor 306. Thus, with detector 304 and processor 306, imaging system 300 may simultaneously record multiple frames of coherent data corresponding to multiple functions and process the recorded data to form images.

Figure 4:
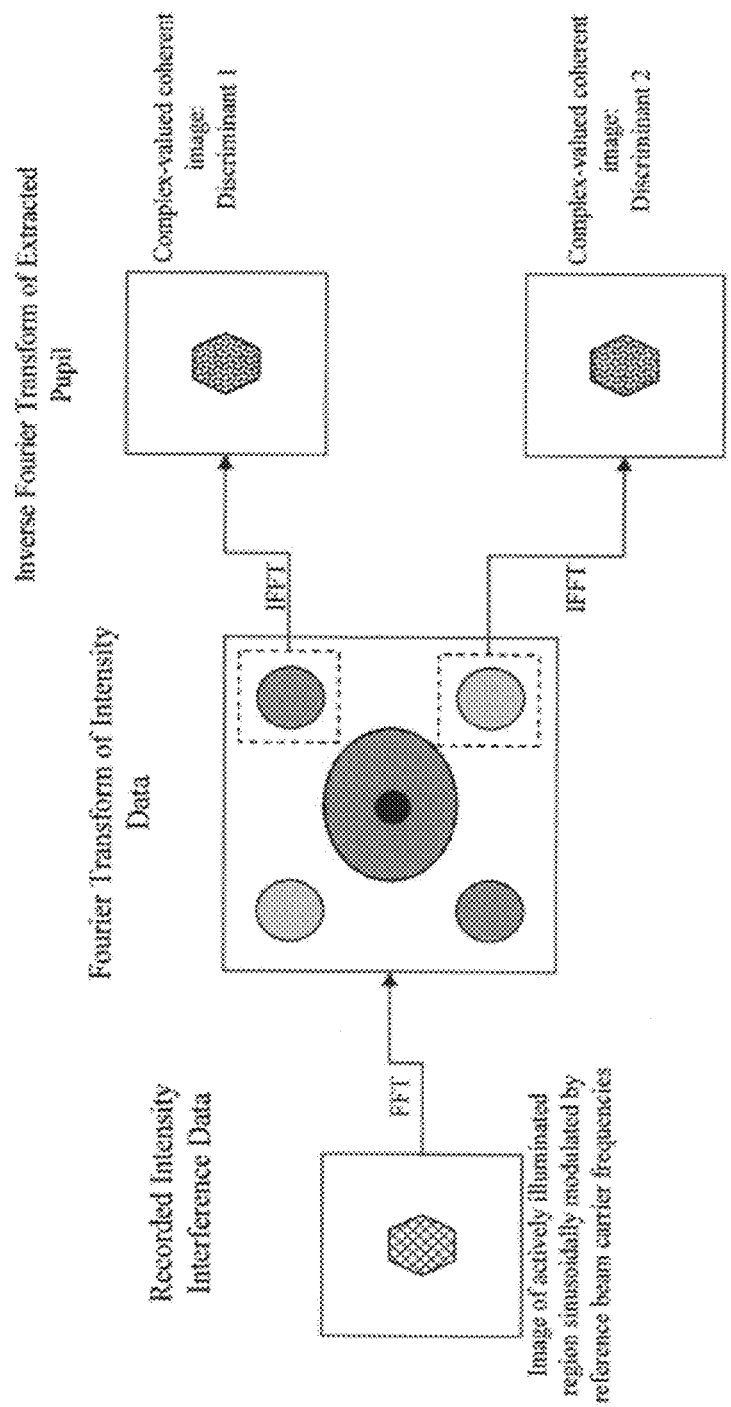
FIG. 4 is an illustration of the Fourier transform process for recording coherent images for two reference beams at different angles, in accordance with one embodiment of the present invention.

FIG. 4 is an illustration of the Fourier transform process for recording coherent images for two reference beams at different angles, in accordance with one embodiment of the present invention. This method may be extendable to multiple carrier frequencies (discriminants). The number of discriminants may be generally limited by having the pupils not overlap. Note also that for the case of having strong reference beams compared to the object beam, the central autocorrelation can be negligible compared to the extracted pupils so that image overlap with the central autocorrelation terms may not be a problem.

Figure 5:
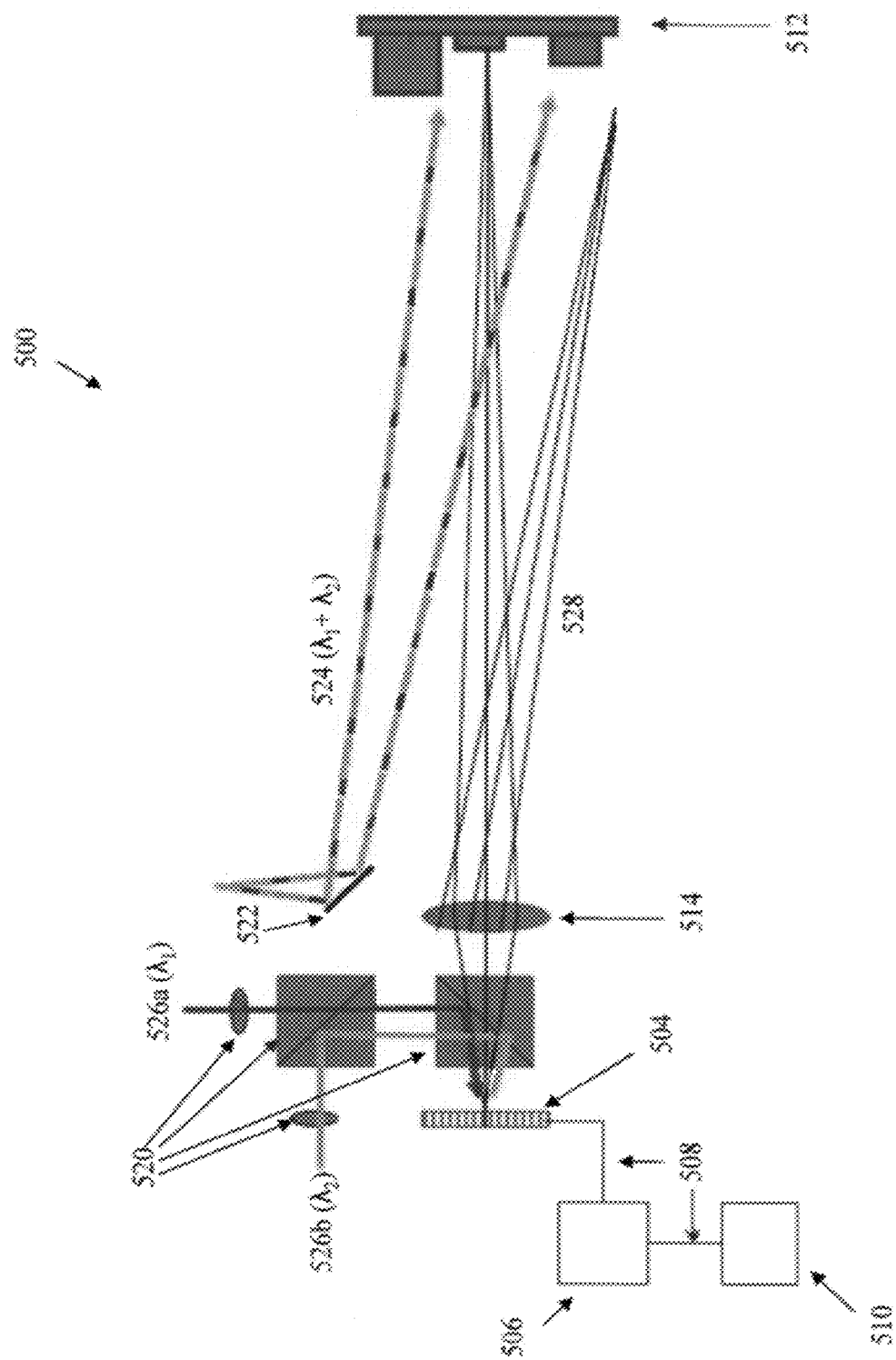
FIG. 5 illustrates an imaging system demonstrating combined passive and active imaging with active 3D imaging, in accordance with one embodiment of the present invention.

FIG. 5 illustrates an imaging system demonstrating combined passive and active imaging with active 3D imaging, in accordance with one embodiment of the present invention. Imaging system 500 is similar to the imaging systems shown in FIGS. 1B and 3. For simplicity, imaging system 500 is shown as a simple lens 514 and the coherent radiation sources and some optical components are not shown.

In accordance with one aspect of the present invention, experimental demonstration of combined passive and active imaging for the case of 3D imaging has been conducted using a system configuration similar to imaging system 100 illustrated in FIG. 1. Instrumentation used included two lasers operating at slightly offset frequencies; the frequency offset was approximately 15 GHz. Non-pulsed lasers were used. The object scene was a stationary, miniature model of a scene. The lasers used were Vortex Tunable diode lasers from New Focus, Inc., operating at a nominal wavelength of 780 nm. These lasers have the capability for electronic control of the wavelength (or frequency). In this case, the lasers were set so that they had a slight wavelength offset. A CMOS detector array from Lumenera, Inca was used. The integration time for this detector array is on-the-order-of milliseconds. Note that this integration time is long compared to the inverse frequency offset of the lasers and thus the intensity recorded corresponds to the intensity superposition of the individual interference patterns as given by Eq. 5.

As shown in FIG. 5, light from the two lasers was split into components. One component, flood beam 524, was used to illuminate an object from scene 512. Scannable flood illuminator 522 may be used to combine, direct, or combine and direct flood beam 524 towards scene 512. Scannable flood illuminator 522 may include optical components such as polarizing mirrors, beamsplitters, or any other suitable optical components. Scannable flood illuminator 522 can be used to combine the two lasers to form a flood beam. For example, flood beam 524 comprises a co-aligned beam of both wavelengths that flood illuminates a selected region of scene 512.

As stated above, the selected region can be chosen by an operator looking at the passive image displayed on user interface 510.

The other components of the lasers are also used to form two reference beams, reference beams 526a and 526b, that illuminate detector 504 at different angles, or with different carrier frequencies. Reference beam illuminator 520 may be used to direct reference beams 526a and 526b towards and illuminate detector 504 at different angles, and may include optical components such as polarizing mirrors, beamsplitters, or any other suitable optical components. Note that FIG. 5 shows just one example of how the reference beams are introduced and that wide varieties of other methods are possible.

Detector 504 operates in either passive mode or active mode and can record signals from either mode. For the passive mode, the lasers may be deactivated and the ambiently illuminated scene is imaged onto the detector 504 by imaging system 500. The signals recorded by detector 504 may be transmitted to processor 506 via communicative coupling 508 or any other suitable communication medium. Processor 506 can be configured to select an object in scene 512. User interface 510 allows a user to operate imaging system 500. For example, user interface 510 may comprise a monitor and a keyboard or mouse. In another embodiment, user interface 510 may be a touch screen monitor. User interface 510 can be any suitable device to enable a user to operate imaging system 500. User interface 510 may transmit signals to or receive signals from processor 506 via communicative coupling 508. For example, user interface 510 may display both passive and active images in response to receiving signals from detector 504 via processor 506 and communicative coupling 508. A user may view the passive image recorded by detector 504 and select a region for active imaging.

Figures 6A, 6B:
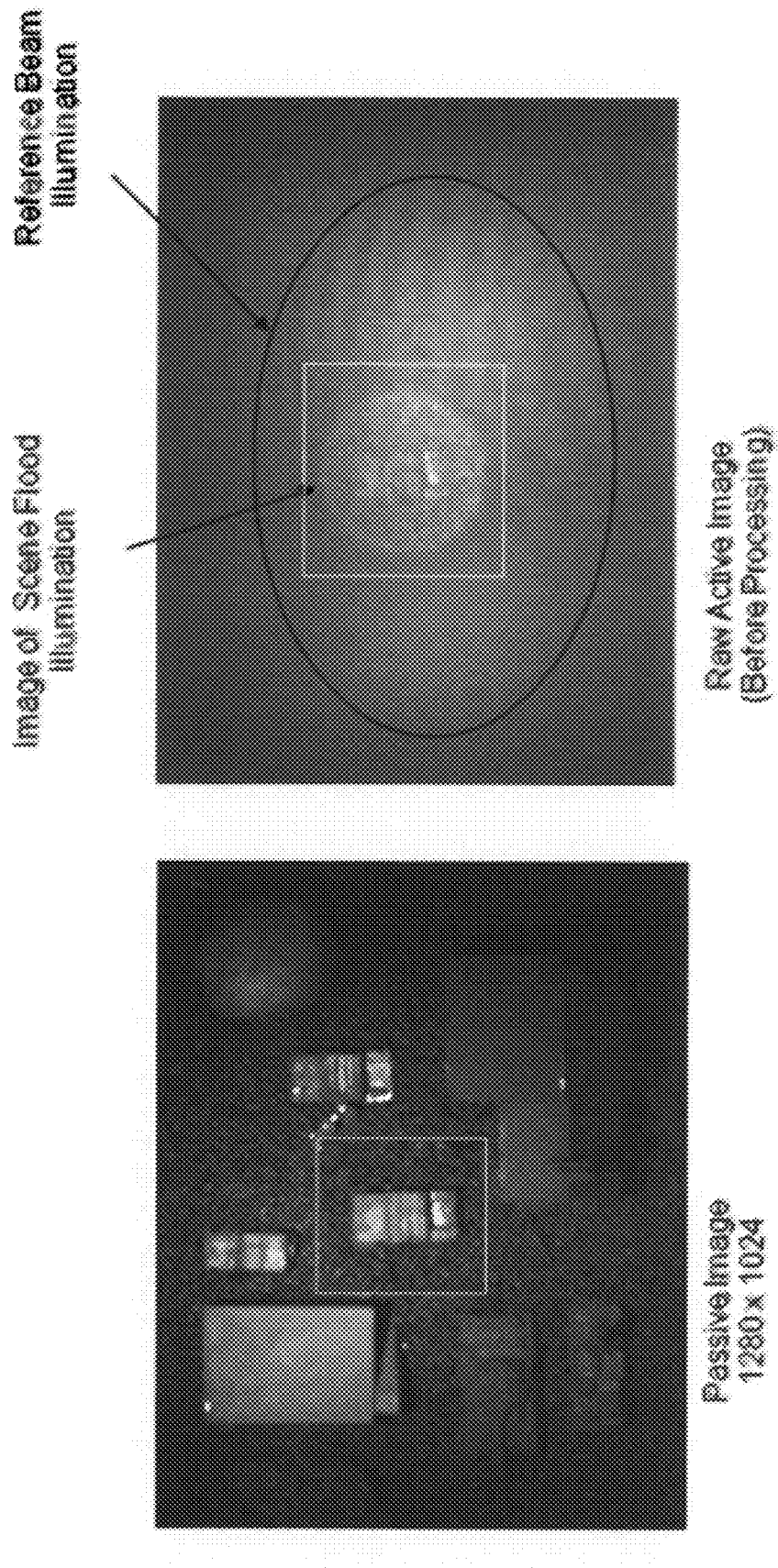
FIGS. 6A and 6B illustrate sample passive and active images collected using the imaging system shown in FIG. 5, in accordance with one embodiment of the present invention.

In the active mode, the lasers may be activated and detector 504 can record the superimposed interference pattern of reference beams 526a and 526b and return radiation 528. Expanded images of the sample recorded passive and active images are shown in FIGS. 6A and 6B. FIG. 6A illustrates the passive image while FIG. 6B illustrates the active image collected using the imaging system shown in FIG. 5, in accordance with one embodiment of the present invention.

FIGS. 7A and 7B illustrate small image regions (image chips) corresponding to passive and active images in the boxed regions in FIG. 6, in accordance with one embodiment of the present invention. Note that the active image shown is the raw data before processing. The important information in this image may be contained in the fine interference detail.

Figure 8:
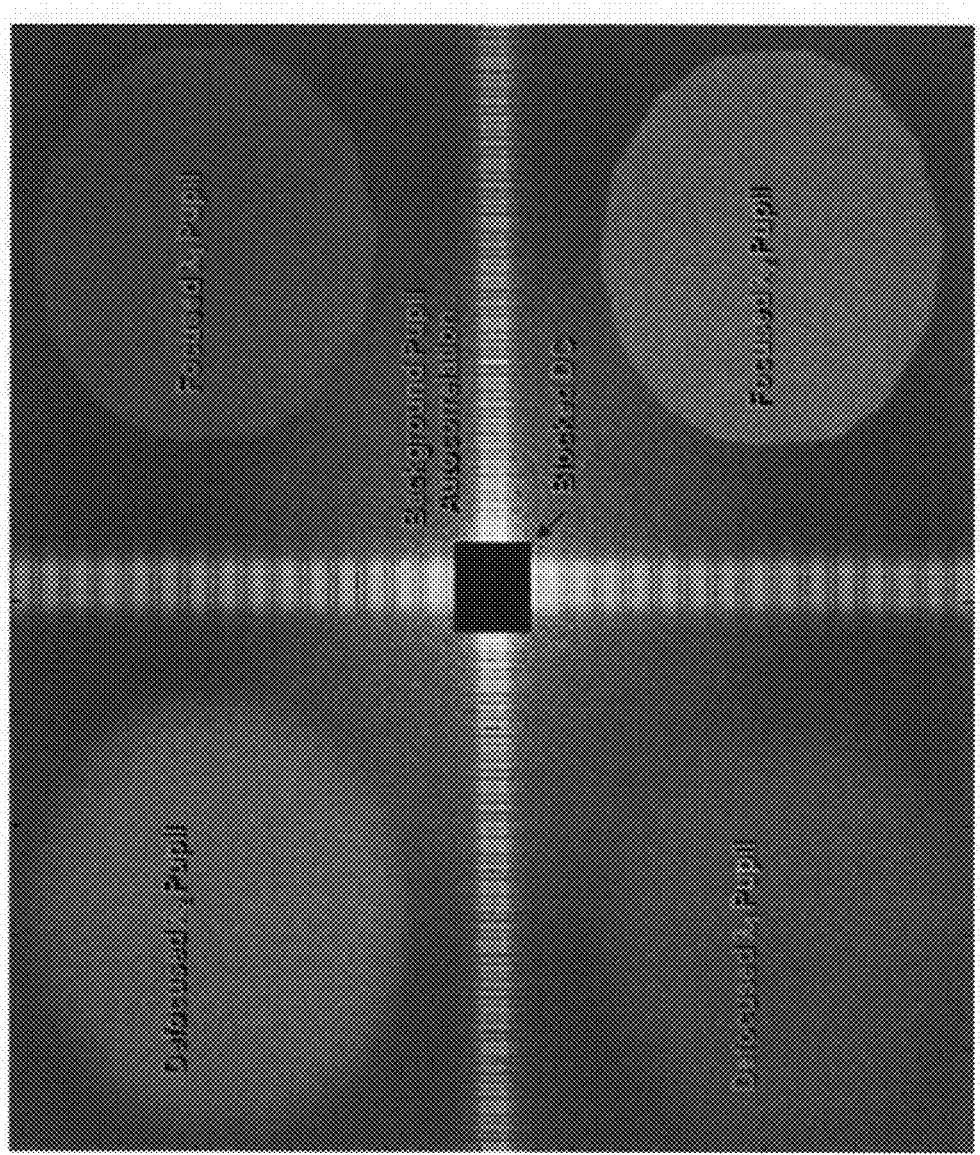
FIG. 8 illustrates the Fourier transform of the active image data shown in FIG. 7, in accordance with one embodiment of the present invention.

FIG. 8 illustrates the Fourier transform of the active image data shown in FIG. 7, in accordance with one embodiment of the present invention. This image corresponds to FIG. 4. As mentioned above, when the image is weak compared to the reference beams, the central autocorrelation term is weak and image terms can overlap with it; this is the case in FIG. 8. Also note that in this example, a small quadratic phase was applied to the image data before Fourier transformation to focus the edges of the pupil in a pair of wavelength 1 ($\lambda_1$) and wavelength 2 ($\lambda_2$) images. The vertical and horizontal stripes are strong sidelobes from the delta functions blocked out in the center of the image.

Note that the image shown in FIG. 8 is of the absolute value of the Fourier transform of the active data. The Fourier transform can be performed using a digital computer, for example processor 506 of FIG. 5, and the complex-valued Fourier transform data may be available.

Figures 9A, 9B:
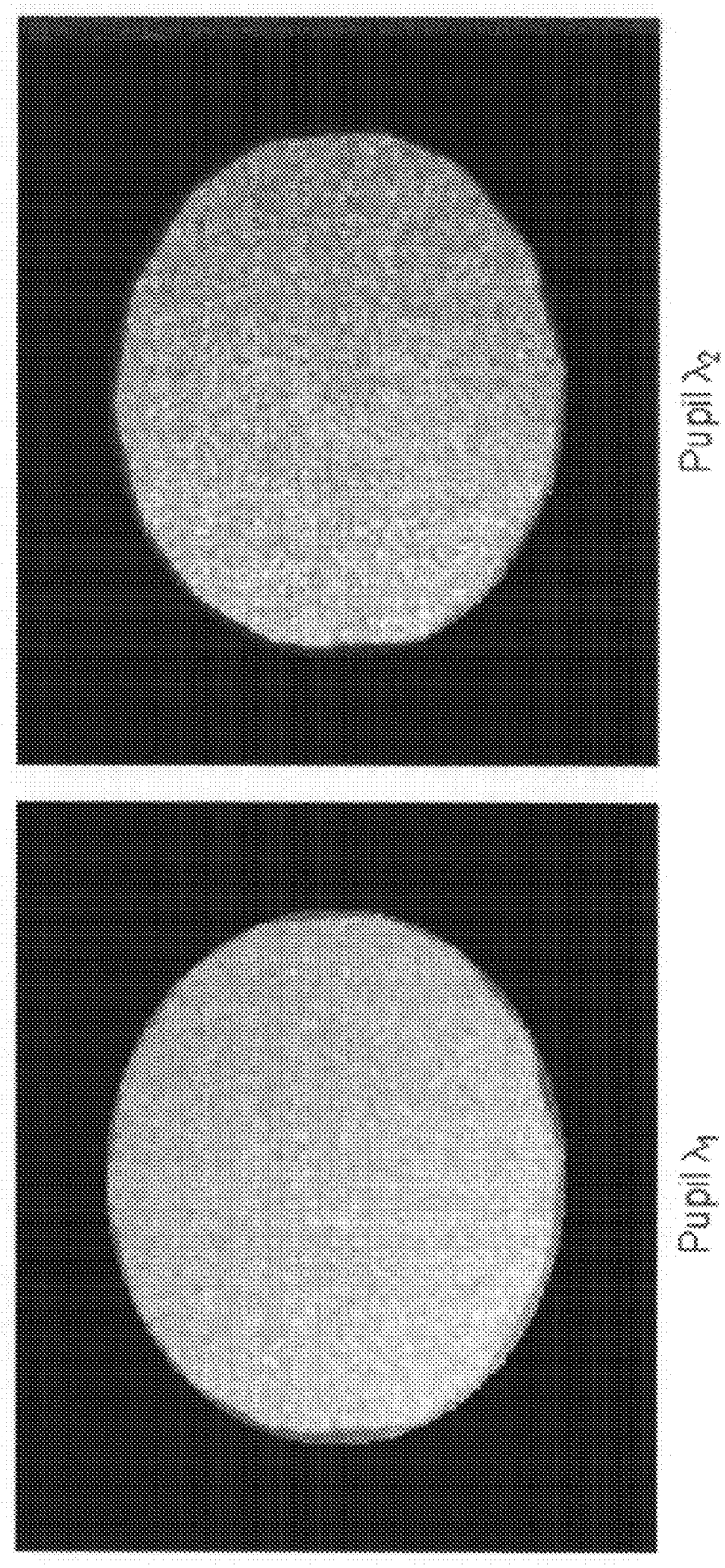
FIGS. 9A and 9B illustrate the extracted pupil data corresponding to wavelengths $\lambda_1$ and $\lambda_2$, in accordance with one embodiment of the present invention.

The complex-valued pupil data corresponding to the two wavelengths from the Fourier transform can then be extracted. The results of this extraction process are shown in FIGS. 9A and 9B. FIG. 9A illustrates the extracted pupil data corresponding to wavelength $\lambda_1$, while FIG. 9B illustrates the extracted pupil data corresponding to wavelength $\lambda_2$, in accordance with one embodiment of the present invention. Again note that the pupil data is actually complex-valued coherent data and that the absolute values of the computer data are shown in FIGS. 9A and 9B.

The inverse Fourier transform of the pupil data can then be computed to form complex-valued coherent images. The result of this operation is shown in FIGS. 10A and 10B. FIG. 10A shows the passive image and FIG. 10B shows the summation of the intensities of the coherent images corresponding to the two wavelengths, $\lambda_1$ and a $\lambda_2$. In the active image, the circular outline of the original flood illuminated region of the scene can be seen; this was obscured by the reference beams in the raw data. Also notice the speckled nature of the active image caused by random scattering from the object's diffusely reflecting surface.

Figure 11B:
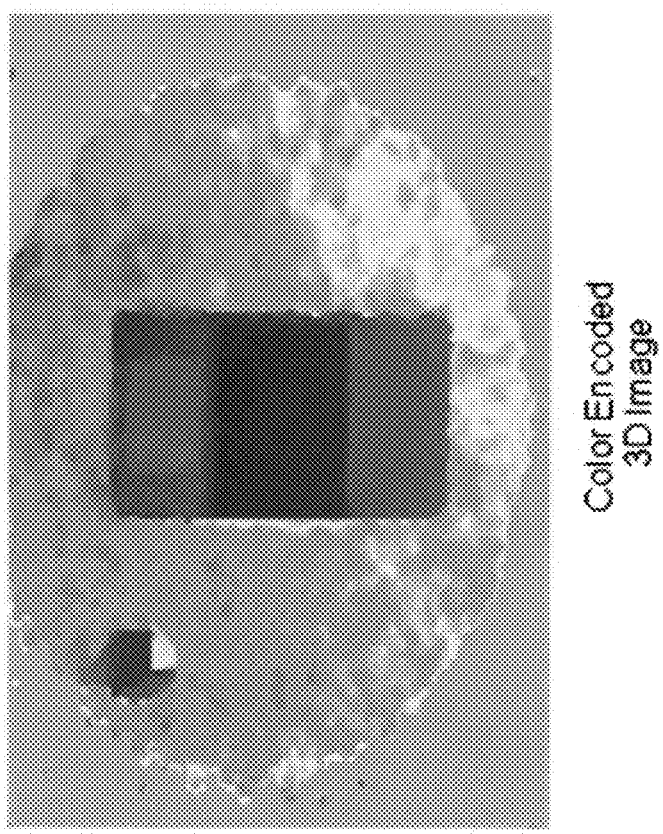
FIGS. 11A and 11B illustrate processed passive and 3D images, with the color encoded 3D image shown in FIG. 11B, in accordance with one embodiment of the present invention.
Figure 11A:
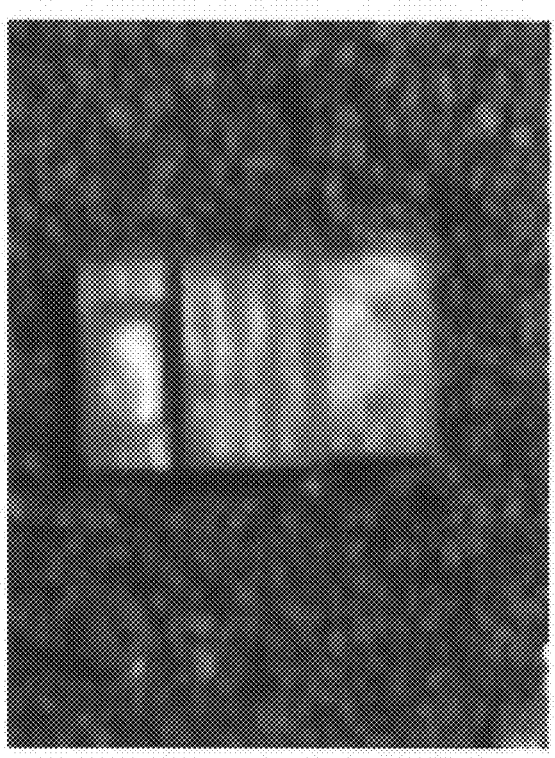

FIGS. 11A and 11B illustrate processed passive and 3D images, with the color encoded 3D image shown in FIG. 11B, in accordance with one embodiment of the present invention.

The phase difference of the coherent images at the two wavelengths can then be computed by processor 506 for example, in processing the active image to generate 3D data. Consider, for example, that a first coherent radiation source (such as coherent radiation source 102a in FIG. 1) and a second coherent radiation source (such as coherent radiation source 102b in FIG. 1) operate at frequencies $v_1$ and $v_2$ with the complex-valued data recorded at, for example, two different wavelengths (e.g., first coherent radiation source outputs reference beam 526a having a first wavelength, and second coherent radiation source outputs reference beam 526b having a second wavelength). 3D images may be formed by determining the phase difference of the two images on a pixel-by-pixel basis. The relationship between distance and phase difference may be represented as $$D = \frac{c\Delta\phi}{4\pi(v_1 - v_2)}, \tag{1}$$

where c is the speed of light, $\Delta\phi$ is the measured phase difference, and $v_1$ and $v_2$ are the two transmitted frequencies. Note that distance determination with this method is subject to ambiguity interval limitation with the ambiguity interval given by $c/2(v_1-v_2)$.

Note that the ranging accuracy may be dependent on the separation of the laser frequencies and system signal-to-noise ratio (SNR). For the data shown, the frequency separation was roughly 15 GHz (giving a range ambiguity interval of 1 cm) and the range accuracy was roughly 1 mm. Also, phase unwrapping can be used to extend the range ambiguity interval of the system. Phase unwrapping is described in "Two-Dimensional Phase Unwrapping: Theory, Algorithms, and Software," Dennis C. Ghiglia and Mark D. Pritt, Wiley, N.J., 1998, which is hereby incorporated by reference in its entirety.

The result of computing the phase difference for the experimental data is shown in FIGS. 11A and 11B; the passive image is shown in FIG. 11A and the 3D image is shown in FIG. 11B. In this 3D image, the third dimension (range) is encoded as color, for example, by processor 506. 3D imaging can be highly desirable because the heights of objects can be determined and hidden image features can be found. For example, in the upper left hand corner of the images, there is an object that is barely discernable in the passive image, whereas, it is highly visible in the 3D image. In addition, the object is roughly the same height as the miniaturized vehicle, so there is a probability that the object is a miniaturized person.

The 3D image from FIG. 11B can also be viewed in perspective, as shown in FIG. 12. This perspective image reveals that the larger object appears to be a pickup truck. While these results show the great value of the 3D image at discerning object features, the passive image is also valuable, especially as a wide area surveillance tool. According to one aspect of the present invention, the imaging system described herein is able to perform both passive and active image using many of the same optics and using the same detector array. Furthermore, the imaging system can produce spatially registered passive and active images and also has significantly reduced size, weight and power requirements over systems operating separately.

As mentioned above, one aspect of the present invention is that fine-resolution, multi-pixel, 3D imaging may be accomplished using a conventional, low speed detector array. In the example presented above, the frequency separation of the lasers is 15 GHz, whereas the integration time of the detector array is nominally milliseconds. Other approaches for 3D imaging based on temporal heterodyne detection may require the use of a high bandwidth detector array which can lead to requiring small format (and often single pixel) scanning 3D systems.

Figure 13:
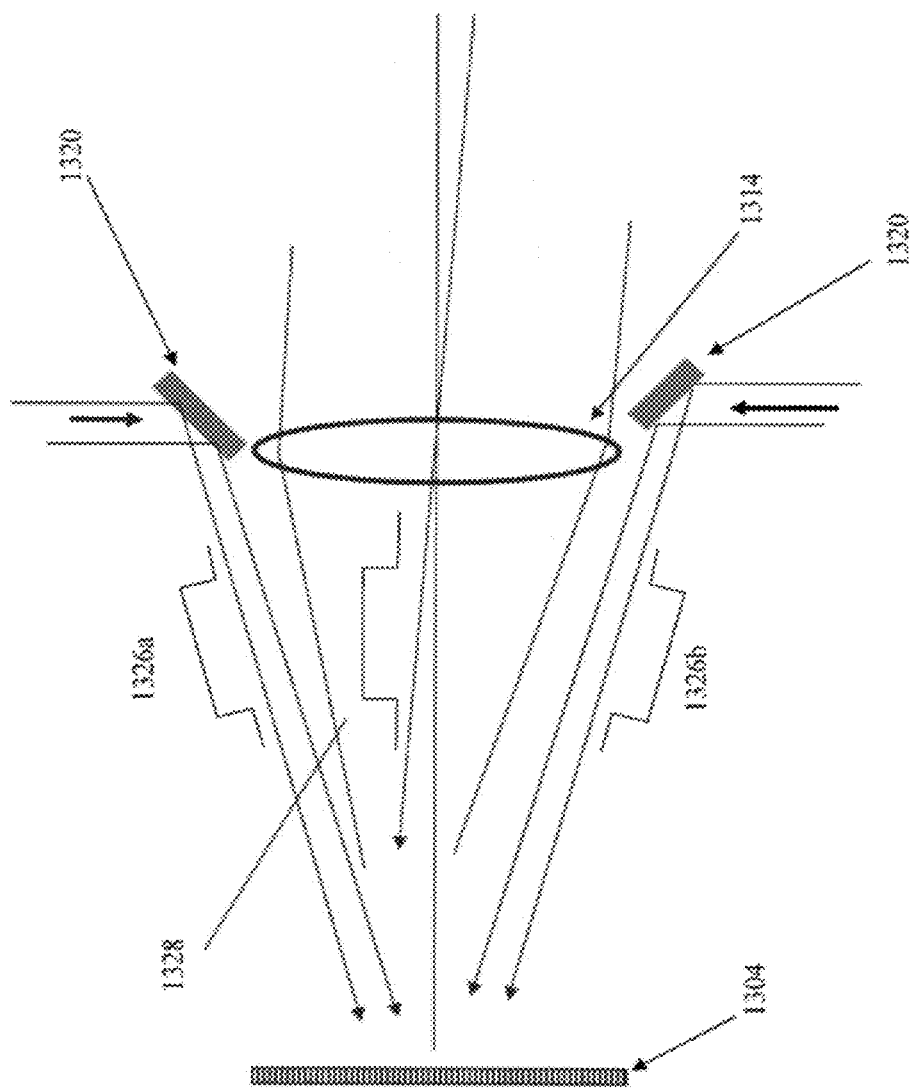
FIG. 13 illustrates an example detector configuration for pulsed illumination, in accordance with one embodiment of the present invention.

FIG. 13 illustrates an example detector configuration for pulsed illumination, in accordance with one embodiment of the present invention. The imaging system shown in FIG. 13 is similar to the imaging systems shown in FIGS. 1B, 3, and 5. For simplicity, the imaging system in FIG. 13 is shown as a simple lens 1314 and the coherent radiation sources, processor, user interface, object, and some optical components are not shown.

For dynamic objects, it may be desirable to use a pulsed radiation source to freeze the object motion for coherent image recording. Reference beams, such as reference beams 1326a and 1326b, may be pulsed and synchronized to return radiation 1328, which is radiation scattered from the object (not shown). By having the reference beams pulsed, one can avoid having detector 1304 exposed unnecessarily to reference beam illumination while the object beam (i.e., return radiation 1328) is not present, thereby minimizing dark noise. The synchronization of the reference beam pulses can be controlled by having a high-speed, single-pixel detector that is separate from the imaging array.

Note that the pulse durations are exaggerated in FIG. 13 (pulse lengths can be longer). The object may be flood illuminated by a pulse of radiation with multiple components satisfying Eq. (5). Return radiation 1328 from the object can then propagate back to detector 1304. Reference beams 1326a and 1326b at two wavelengths and different angles, as discussed above, can illuminate detector 1304. Reference beam illuminator 1320 may direct the reference beams 1326 towards detector 1304 using optical components such as polarizing mirrors, beamsplitters, or any other suitable optical components. Detector 1304 may record the intensity of the of the interference patterns between the reference beams and return radiation 1328. Processing of the data can be performed in the same manner as described above.

For 3D imaging, the pulsed illumination can consist of two co-aligned pulses at slightly different wavelengths or frequencies. Consider pulses with a frequency offset of $\Delta v=1$ GHz with a pulse duration of $\Delta T=10$ nsec. It follows that over the 10 nsec duration, the beating of the lasers will go through N=10 cycles where $N=\Delta v \Delta T$. Equation (5) is thus satisfied because interference of the reference beams is averaged out via the multiple beats. With pulsed illumination, the tolerance for longitudinal motion of the object is given by $V<<\lambda/\Delta T$. With a nominal wavelength of 1 micron, the longitudinal velocity can be much less than 100 m/sec or 225 mph. This can be readily satisfied for most objects. If there is a larger relative longitudinal motion, which can be the case if the sensor or detector is on an air-platform, then a high-speed detector can be used to detect the beat frequency and shift the frequency of the reference beams so that Doppler beating is not exhibited over the pulse duration interval.

Figure 14:
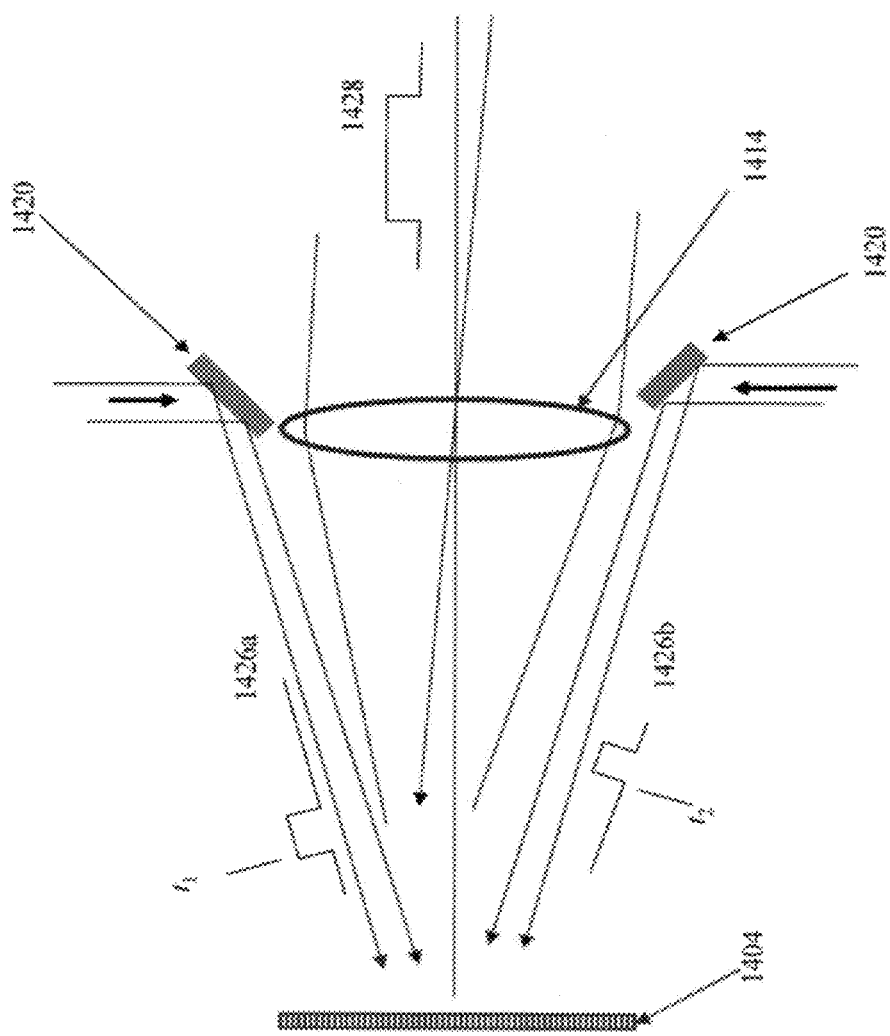
FIG. 14 illustrates an example detector configuration for object motion detection using time-staggered reference beams, in accordance with one embodiment of the present invention.

FIG. 14 illustrates an example detector configuration for object motion detection using time-staggered reference beams, in accordance with one embodiment of the present invention. The imaging system shown in FIG. 14 is similar to the imaging systems shown in FIGS. 1B, 3, 5 and 13. For simplicity, the imaging system in FIG. 14 is shown as a simple lens 1414 and the coherent radiation sources, processor, user interface, object, and some optical components are not shown.

Another mode of operation for active sensing mentioned above is motion or vibration sensing or moving target indication. An example embodiment of this operation mode is illustrated in FIG. 14. In an exemplary operation, the object (not shown) is illuminated with a pulse of radiation from a single coherent radiation source (not shown) operating at a single wavelength, although more than one coherent radiation source may be used. When the illumination pulse returns (i.e., return radiation 1428) to form the active image on detector 1404, reference beams 1426a and 1426b (also pulsed with pulse duration short compared to the object illuminating pulse), illuminate detector 1404 at different, non-overlapping or staggered times $t_1$ and $t_2$. Reference beam illuminator 1420 may direct the reference beams towards detector 1404 using optical components such as polarizing mirrors, beamsplitters, or any other suitable optical components.

With the reference beams illuminating detector 1404 at slightly separated times, coherent images can thus be recorded at slightly separated times. If the object moves between the coherent image recordings by an amount comparable to the wavelength of light, the phase of the image may change. The amount of motion can then be characterized via the amount of phase change between the two coherent images. If, for example, the separation between $t_1$ and $t_2$ is 100 nsec and the wavelength of operation is 1 micron, the imaging system can then be able to sense longitudinal motions of approximately 10 meters per second. Thus, image-based quantification of high-speed motions can be accomplished using a commonly available detector array with a relatively long integration time. The imaging system can also be used as a moving target indicator. In this mode, the passive image can be used for broad area surveillance, and the active image can be used to find moving, or vibrating, targets to sense activity.

FIG. 15 illustrates an exemplary coherent radiation source, in accordance with one embodiment of the present invention. Such a coherent radiation source can be used with the imaging systems in FIGS. 1A, 1B, 3, 5, 13 and 14.

In one embodiment of the present invention, radiation beam pulses are generated from the injection seed beam of an injection seeded pulsed laser. For example, coherent radiation source 1502 may be an injection-seeded pulsed laser. Coherent radiation source 1502 may comprise a master oscillator 1554, optical switch 1558, and slave device 1560. Master oscillator 1554, which may be a gas laser, solid-state laser, semiconductor laser, or fiber laser, or any other suitable coherent radiation source, may output a radiation beam 1556, which may be directed to a slave device 1560 by optical switch 1558. Slave device 1560 may be a pulsed laser cavity, a power amplifier, a power oscillator, or any other suitable device configured to receive radiation beam 1556 from master oscillator 1554 and output a pulsed radiation beam 1564. Radiation beam 1556 may be a frequency stabilized, non-pulsed laser beam that is injected into slave device 1560. This can cause the wavelength of radiation beam 1556 to match the wavelength of slave device 1560, for example, a seed laser of slave device 1560. In one embodiment of the present invention, the resulting pulsed radiation beam 1564 can be sent to the object. In another embodiment of the present invention, the resulting pulsed radiation beam 1564 can also be sent to the detector array.

Reference beams 1562 can be generated by using optical switch 1558, which may be configured to be controlled by processor 1506, to carve out sections of first radiation beam 1556 to illuminate the detector array either simultaneously or at staggered times $t_1$ and $t_2$, depending on the application. Processor 1506 may be communicatively coupled to optical switch 1558 via communicative coupling 1508 or any other suitable communication medium. For example with two coherent radiation sources, the optical switch of a first coherent radiation source may be configured to output a portion of a first radiation beam and a second optical switch of a second coherent radiation source may be configured to output a portion of a second radiation beam at substantially the same temporal period or different temporal periods. In practice it can be necessary to amplify the reference beams to ensure that they have sufficient energy to illuminate the entire detector array. Also note that for the staggered case, the second reference pulse can be a delayed version of the first reference pulse where the delay can readily be obtained by passing the part of the first pulse through a fiber optic delay.

Furthermore, processor 1506 may control optical switch 1558 so as to "gate" at least a portion of reference beam 1562 so that the beam radiates the detector during a temporal period when return radiation from a radiated object is also radiating the detector. FIG. 15 presents just one example of a coherent laser source used for the imaging systems described herein, and that wide varieties of other methods are possible.

According to another embodiment of the present invention, another mode of operation is based on having the two reference beams be at orthogonal polarizations. In this case, Eq. (5) holds and the image at two polarizations can be evaluated. A processor communicatively coupled to the detector, for example processor 106 of FIG. 1, can be configured to form at least one polarimetric image using the first polarization state, the second polarization state, or the first polarization state and the second polarization state recorded by the detector. In one aspect of this sensing mode, the coherent images are complex-valued and thus, the phase properties of the polarization, which yield information concerning material properties, can be evaluated. Information concerning these material properties is described in "Polarimetry," R. A. Chipman, in Handbook of Optics, 2nd ed., M. Bass, ed., McGraw-Hill, New York, 1995, which is hereby incorporated by reference in its entirety.

According to one approach, it is possible to determine, and correct for, aberrations by maximizing the sharpness of active, coherent images. According to one aspect of the present invention, the coherent image can be digitally corrected for aberrations caused by instrumentation errors or aberrations imparted by atmospheric turbulence. This can be done by a processor, for example, processor 106 of FIG. 1. In accordance with another aspect of the present invention, with the active and passive images sharing a common imaging system, the active image can be used to determine the wavefront error and apply the conjugate of the wavefront error to a deformable mirror. By doing this, the aberrations of the active and passive images can be corrected. For example, the aberrations of the active and passive images can be removed. In this manner, the active image performs the function analogous to that of the wavefront sensor in other adaptive optical systems with a key difference being that the active method can determine the aberrations digitally, whereas other adaptive optical systems use an optical wavefront sensor that may be based on a Shack-Hartman wavefront sensor. Another aspect of the present invention is that for anisoplanatic conditions, where the aberrations vary over the field-of-view, the aberrations for a digitally selectable image chip, or field-of-view region, can be determined and the corresponding passive image over that field-of-view can be corrected.

According to another aspect of the present invention, correcting aberrations in the incoherent image involves digitally filtering the image with a filter designed using knowledge of the aberrations as determined by maximizing the sharpness of the active image. For example, with the aberrations known via the active channel, an image filter, such as a Weiner filter, can be constructed to partially correct the incoherent image for aberrations imparted by errors in the optical system or atmospheric turbulence. These types of processing can be performed by a processor, for example, processor 106 of FIG. 1.

In accordance with one aspect of the present invention, digital holographic detection offers detection performance corresponding to the shot-noise limit. In one approach, the SNR for digital holographic detection may be equal to the number of photoelectrons received from the object per detector pixel. The digital holographic detection process may thus be able to overcome a variety of other noise sources that are encountered with non-holographic detection. By using active imaging with digital holographic detection, better detection performance may be attained compared with other methods. Thus, in another aspect of the present invention, improved detection properties over other methods are provided. Furthermore, according to another aspect of the present invention, active imaging with lower illumination levels is provided, which in turn offers sensors with lower size, weight and laser power requirements over other active detection methods.

Figures 16A, 16B:
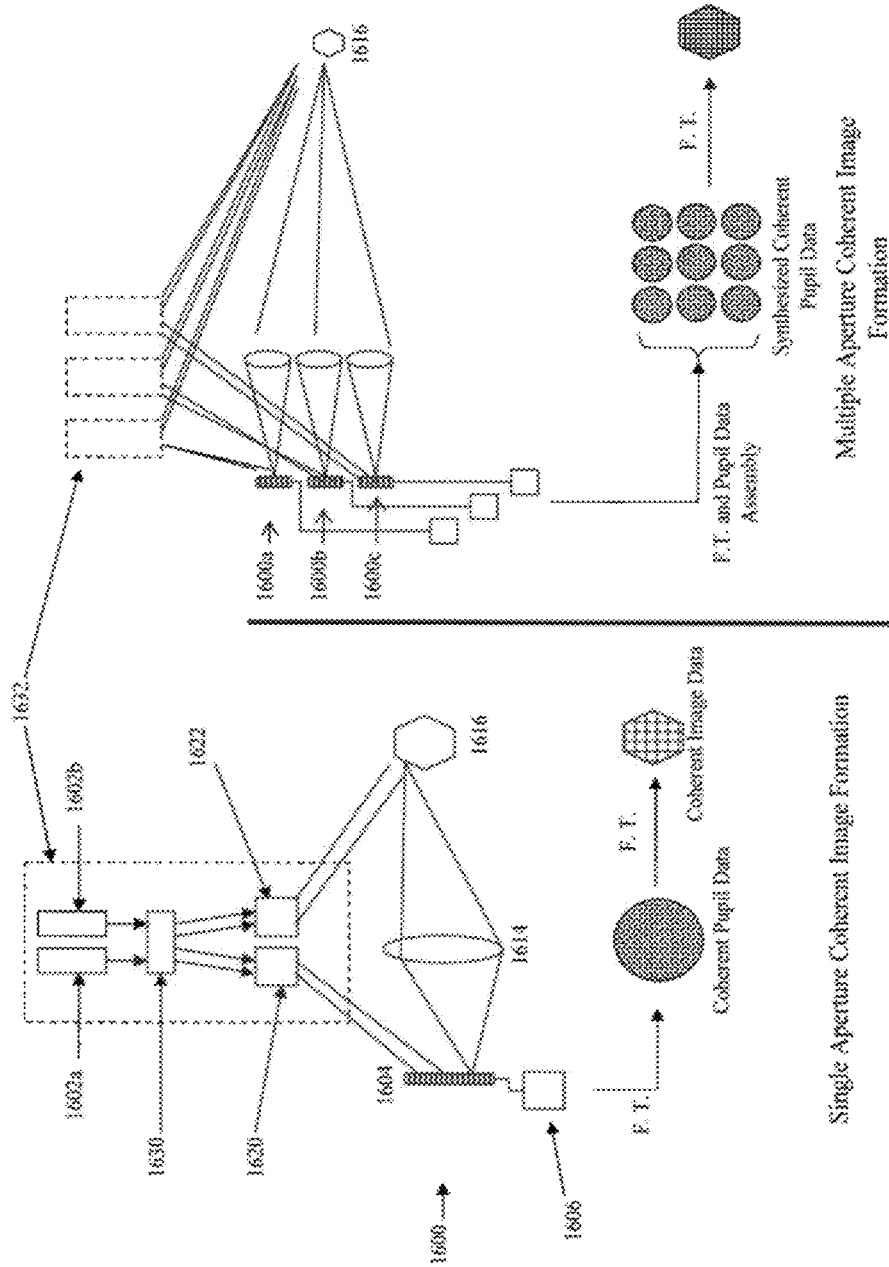
FIGS. 16A and 16B illustrate single aperture and multiple aperture coherent image formation processes, in accordance with various embodiments of the present invention.

FIGS. 16A and 16B illustrate single aperture and multiple aperture coherent image formation processes, in accordance with various embodiments of the present invention. The imaging systems shown in FIGS. 16A and 16B are similar to the imaging systems shown in FIGS. 1B, 3, 5, 13 and 14. For simplicity, imaging system 1600 in FIG. 16A is shown as a simple lens 1614 and the coherent radiation sources 1602a and 1602b, splitter 1630, reference beam illuminator 1620, scannable flood illuminator 1622 are shown simply as radiation source unit 1632. Furthermore, for simplicity, the user interface and some optical components are not shown.

According to one aspect of the present invention, combined active and passive sensing offers multi-aperture sensing capability as well as single aperture sensing discussed above. Multi-aperture capability allows for the synthesis of a larger imaging aperture, which may provide finer spatial resolution than a single aperture. This multi-aperture capability may be possible because the active mode discussed herein can result in coherent detection; as noted above, digital holographic detection allows for complex-valued image data (which may also be called a coherent image) to be recorded. Combining multiple single aperture coherent image data to create a larger synthesized aperture is described in U.S. Pat. No. 7,405,834, entitled "Compensated Coherent Imaging for Improved Imaging and Directed Energy Weapons Applications", which is hereby incorporated by reference in its entirety for all purposes. As shown in FIGS. 16A and 16B, coherent data for each of the sub-apertures corresponds, for example, to a circular, complex-valued pupil (data-region) such as the one shown in the center of FIG. 2. Processor 1606, for example, may compute the Fourier transform of the signals recorded by detector 1604 to extract coherent image data. FIG. 16B shows multiple imaging systems 1600a, 1600b and 1600c to illustrate multiple aperture coherent image formation. Each of these imaging systems are similar to imaging system 1600 shown in FIG. 16A. More or less imaging systems than shown may be utilized. As described in U.S. Pat. No. 7,405,834, piston-tip-tilt alignment of the data from the individual sub apertures can be determined by optimizing a sharpness metric. With this alignment, fine resolution imaging corresponding to the large, synthesized aperture size can be achieved. Coherent data from individual sub-aperture multi-function coherent imaging systems may be combined digitally using a computer, processor, integrated circuit, or any other suitable device to achieve fine-spatial resolution imaging corresponding to a large synthetic aperture. For example, processor 1606 may be used for such processing.

Figure 17B:
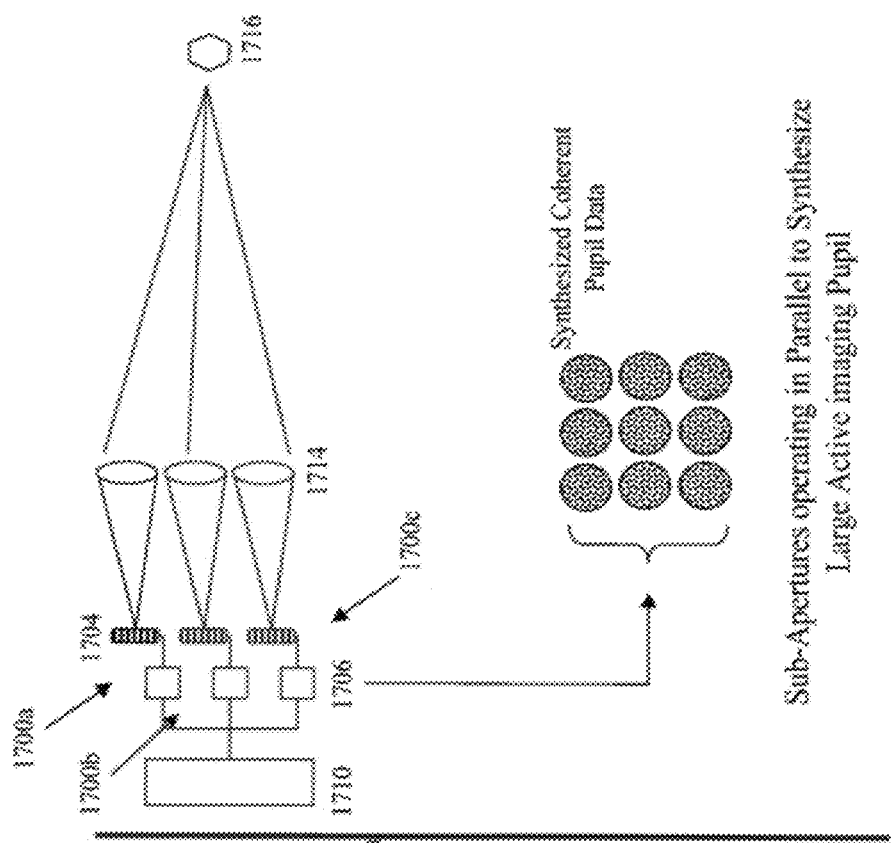
FIGS. 17A and 17B illustrate two modes of operation for multiple aperture imaging array, in accordance with various embodiments of the present invention.
Figure 17A:
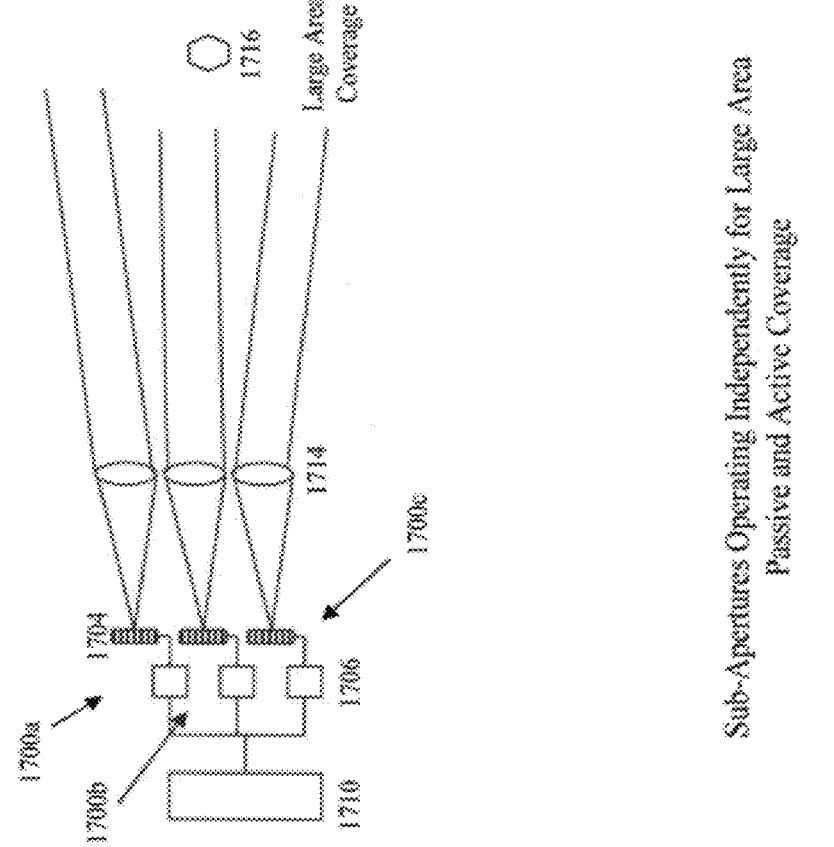

FIGS. 17A and 17B illustrate two modes of operation for multiple aperture imaging array, in accordance with various embodiments of the present invention. Imaging systems 1700a, 1700b, and 1700c shown in FIGS. 17A and 17B are similar to the imaging systems shown in FIGS. 1B, 3, 5, 13, 14, and 16. For simplicity, imaging systems 1700a, 1700b, and 1700c are shown as simple lenses 1714 and the coherent radiation sources and some optical components are not shown.

FIG. 17A shows multiple apertures pointing in different directions for large area coverage. Each imaging system, for example imaging systems 1700a, 1700b, and 1700c, includes detectors 1704 and processors 1706. More or less imaging systems than shown may be utilized. The signals recorded by detectors 1704 may be transmitted to processors 1706 via communicative coupling or any other suitable communication medium. Each imaging system is shown to have a separate processor. However, the separate imaging systems may share one processor. As shown, the imaging systems also share one user interface 1710. User interface 1710 allows a user to operate the imaging systems. For example, user interface 1710 may comprise a monitor and a keyboard or mouse. In another embodiment, user interface 1710 may be a touch screen monitor. User interface 1710 can be any suitable device to enable a user to operate imaging systems 1700. User interface 1710 may transmit signals to or receive signals from processors 1706 via communicative coupling. For example, user interface 1710 may display multiple passive and active images to the user in response to receiving the signals from detectors 1704.

The intensity of the passive images may also be recorded by detectors 1704. The passive images with resolution corresponding to the aperture sizes of a single aperture may be useful for certain imaging functions such as wide area surveillance. With a multiple aperture system, passive (and active) images can be obtained from different sections of the field-of-view to increase area coverage. Once a user selects a specific region for fine-resolution interrogation by using user interface 1710, all of the apertures can be pointed to the area of interest, and that area can then be actively illuminated and an active image with resolution corresponding to the composite or synthesized aperture can be obtained.

For example, a user may select an object 1716, for example, of the passive images for further interrogation. The user may select a certain region, such as object 1716, for active imaging or tracking, and this selection may be transmitted to processors 1706 in the form of signals for processing. Processors 1706 may then be configured to control the radiation source units (not shown) in response to selecting object 1716. For example, processors 1706 may transmit signals to or receive signals from the radiation source units via communicative coupling to activate the multiple coherent radiation sources and direct the respective reference beams and flood beams accordingly. The radiation source units may be configured to locate object 1716 and direct the flood beams from each respective radiation source unit towards object 1716 for active imaging or tracking.

FIG. 17B shows multiple apertures pointing at the same object 1716 region to synthesize a large aperture and form a fine resolution image, in accordance with various embodiments of the present invention. Note that this same multi-aperture image synthesis capability applies to other active imaging as well as the other modes (3D, vibration and polarization) discussed above.

The imaging systems described herein may be expanded, such that such systems may comprise more than one coherent radiation source, each outputting a radiation beam. For example, each radiation beam may have a distinct wavelength, range of wavelengths, output spectrum, polarization, or any combination thereof. Each coherent radiation source may be, for example, spatially offset from one another, and may be configured such that each radiation beam output by the two or more coherent radiation sources is spatially offset, angularly offset, or spatially and angularly offset from each other. In addition, the coherent radiation sources may be configured such that each of their output beams are pulsed to reduce imaging system sensitivity to motion of an object to be imaged.

Another aspect of the present invention relates to a method for combined active and passive imaging, comprising: directing at least a portion of a first coherent radiation beam towards a first detector; radiating an object in a first scene with at least a portion of the first coherent radiation beam; forming a first intensity pattern at a first detector by interfering with at least a portion of the first return radiation from the radiated object with at least a portion of the first coherent radiation beam; recording a first instance of the first intensity pattern; and recording ambient light reflected from the first scene.

The method may further comprise forming a signal using the recorded ambient light from the first scene. The method may further comprise locating and tracking the object. The method may further comprise displaying the first scene. The method may further comprise selecting the object in the first scene. The method may further comprise forming a digital signal using the recorded first intensity pattern and performing a Fourier transform of the digital signal. The method may further comprise selecting another object in the first scene.

One aspect of the present invention relates to a method for combined active and passive imaging, comprising: directing at least a portion of a first coherent radiation beam and at least a portion of a second coherent radiation beam towards a first detector, wherein at least a portion of the second coherent radiation beam is spatially offset, angularly offset, or spatially and angularly offset from at least a portion of the first coherent radiation beam; combining at least a portion of the first coherent radiation beam and at least a portion of the second coherent radiation beam to form a first flood beam; radiating an object in a first scene with at least a portion of the first flood beam; forming a first intensity pattern by interfering with at least a portion of the first return radiation from the radiated object with at least a portion of the first coherent radiation beam and a second intensity pattern with at least a portion of the first return radiation from the radiated object and at least a portion of the second coherent radiation beam; simultaneously recording a first instance of a first superposition of the first intensity pattern and the second intensity pattern; and recording ambient light reflected from the first scene.

The method may further comprise forming a first signal using the recorded ambient light from the first scene. The method may further comprise locating and tracking the object. The method may further comprise displaying the first scene. The method may further comprise selecting the object in the first scene. The method may further comprise forming a digital signal using the recorded first superposition and performing a Fourier transform of the digital signal. The method may also comprise extracting a first complex-valued component object image and a second complex-valued component object image from the Fourier transform. The method may further comprise selecting another object in the first scene.

The method may further comprise determining a phase difference between the first complex-valued component object image and the second complex-valued component object image on a pixel-by-pixel basis, and forming at least one three-dimensional image from the determined phase difference.

The method may also comprise: directing at least a portion of a third coherent radiation beam and at least a portion of a fourth coherent radiation beam towards a second detector, wherein at least a portion of the fourth coherent radiation beam is spatially offset, angularly offset, or spatially and angularly offset from at least a portion of the third coherent radiation beam; combining at least a portion of the third coherent radiation beam and at least a portion of the fourth coherent radiation beam to form a second flood beam; radiating at least a portion of the object with the second flood beam; forming a third intensity pattern by interfering with at least a portion of the second return radiation from the radiated object with at least a portion of the third coherent radiation beam and a fourth intensity pattern with at least a portion of the second return radiation from the radiated object and at least a portion of the fourth coherent radiation beam; simultaneously recording a first instance of a second superposition of the third intensity pattern and the fourth intensity pattern; and recording ambient light reflected from the second scene.

The method may further comprise outputting a first signal with the recorded ambient light from the first scene and outputting a second signal having the recorded first superposition from the first detector. The method may further comprise outputting a third signal with the recorded ambient light from the second scene and outputting a fourth signal having the recorded second superposition from the second detector. The method may further comprise locating and tracking the object. The method may further comprise displaying the first scene and the second scene. The method may further comprise selecting the object. The method may further comprise selecting another object.

Another aspect of the present invention relates to a method for combined active and passive imaging, comprising: outputting a first coherent radiation beam and a second coherent radiation beam; pulsing the first coherent radiation beam so as to output a first pulsed radiation beam coherent with the first radiation beam towards an object in a scene; pulsing the second coherent radiation beam so as to output a second pulsed radiation beam coherent with the second radiation beam towards the object in the scene; gating at least a portion of the first coherent radiation beam such that at least a portion of the first radiation beam radiates a detector during a temporal period when at least a portion of the return radiation is returning from the object; gating at least a portion of the second coherent radiation beam such that at least a portion of the second radiation beam radiates the detector during a temporal period when at least a portion of the return radiation is returning from the object; simultaneously recording a first instance of a superposition of a first intensity pattern of a first interference between at least a portion of the first coherent radiation beam and at least a portion of the return radiation from the object, and a second intensity pattern of a second interference between at least a portion of the second coherent radiation beam and at least a portion of the return radiation from the object; and recording ambient light reflected from the scene.

The method may further comprise displaying the scene. The method may further comprise selecting the object in the scene. The method may further comprise gating of the portion of the first coherent radiation beam and the gating of the portion of the second coherent radiation beam at substantially the same temporal period or different temporal periods. The method may further comprise selecting another object in the scene.

According to one aspect, the present invention provides an imaging system for recording passive and coherent active images on the same detector array in a manner that allows broad area passive imaging and narrow field active imaging. One approach in this area has concentrated on performing coherent image detection in the pupil plane. Other approaches based on image plane detection have also had to rely on high-speed detector arrays which are available only in small formats. In accordance with various embodiments of the present invention, an imaging system is provided which is compatible with passive imaging. In one embodiment, the imaging system allows for combined active and passive image tracking.

According to one approach, an active image tracker requires a high-speed tracking mirror or other beam steering device. In accordance with one aspect of the present invention, tracking may be performed using a large format detector array. This arrangement can be useful for tracking applications and may also be amenable to constructing an array of similar imaging systems to look in multiple directions or to synthesize a larger imaging aperture by digitally combining the coherent images from each element of the array.

Coherent imaging modes include 3D imaging, which may use multiple laser wavelengths, and vibration imaging, which may use multiple time-staggered reference pulses. Because this imaging method can be coherent (a spatial analogue to temporal heterodyne detection), active images with very low scene illumination levels may be formed, thus minimizing laser power requirements. In one embodiment, the imaging method allows aperture synthesis for fine resolution imaging.

According to one embodiment of the present invention, an imaging system may use an imaging lens to image a distant object onto a detector array, forming a passive image. In accordance with another embodiment of the present invention, an active image is formed by flood illuminating a portion of the distant scene with a coherent laser beam. Light from objects in the actively illuminated region may be imaged onto the detector array. At the same time, a reference beam of light may also be incident on the detector array. The object and reference beams interfere and the interference pattern may be recorded by the detector array. The angle of incidence of the reference beam of light may be chosen to produce a specified spatial carrier frequency of the coherent image information. Multiple reference beams with distinct spatial frequencies may be used to achieve multi-channel coherent imaging.

To extract the coherent images, the image chip corresponding to the coherently illuminated region of the scene is extracted, in accordance with one aspect of the present invention. The two-dimensional (2D) Fourier transform of this image chip may then be digitally computed by a processor, for example. Because the coherent information is recorded on a distinct spatial carrier, the Fourier transform of the complex-valued coherent image may lie in a distinct region in the Fourier domain and can be extracted. With this extracted data, an inverse Fourier transform may be performed to provide the complex-valued, coherent active image. This same process can be repeated for additional laser frequencies. In doing so, a 3D image may be generated via simple phase difference processing on the coherent images. Various processing, such as digital focusing or interferometric analysis, may be performed on the extracted object.

In accordance with one embodiment of the present invention, the active flood illumination of the scene and the reference beams may be pulsed. The reference beams may be triggered to illuminate the detector array at the same time as the light that returns from the object. Furthermore, 3D images may be generated by temporally staggering the reference beam illumination pulses. In other embodiments of the present invention, other coherent images may be generated besides intensity or 3D images. For example, the present invention may be extended to polarization images.

In accordance with another aspect of the present invention, photon-limited detection of signals that are dominated by detector or background noise may be performed. This may be accomplished by having one or more strong local oscillators, such as one or more coherent radiation sources. For digital holographic applications, instead of increasing the magnitude of one or more local oscillators, the magnitude of the reference radiation beam may be increased. Thus, the signal-to-noise ratio of recorded images may be improved.

The description of the invention is provided to enable any person skilled in the art to practice the various configurations described herein. While the present invention has been particularly described with reference to the various figures and configurations, it should be understood that these are for illustration purposes only and should not be taken as limiting the scope of the invention.

There may be many other ways to implement the invention. Various functions and elements described herein may be partitioned differently from those shown without departing from the sprit and scope of the invention. Various modifications to these configurations will be readily apparent to those skilled in the art, and generic principles defined herein may be applied to other configurations. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. An "exemplary embodiment" is an example of a configuration. All structural and functional equivalents to the elements of the various configurations described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

What is claimed is:

1. A combined active and passive imaging system comprising:
    a first radiation source unit comprising:
        a first coherent radiation source configured to output a first radiation beam;
        one or more first optical components configured to direct at least a portion of the first radiation beam towards a first detector; and
        one or more second optical components configured to direct the first radiation beam towards an object in a first scene, wherein the first scene is larger than the object;
    the first detector configured to record a first instance of a first intensity pattern of a first interference between at least a portion of the first radiation beam and at least a portion of a first return radiation from the object, wherein the first detector is further configured to record ambient light reflected from the first scene, and wherein the first detector is further configured to output a first signal with the recorded ambient light reflected from the first scene and a second signal with the recorded first intensity pattern;
    a processor communicatively coupled to the first detector and the first radiation source unit, wherein the processor is configured to receive the first signal and the second signal, and wherein the processor is further configured to select the object in the first scene;
    a second radiation source unit comprising:
        a second coherent radiation source configured to output a second radiation beam;
        a third coherent radiation source configured to output a third radiation beam;
        one or more third optical components configured to direct at least a portion of the second radiation beam and at least a portion of the third radiation beam towards a second detector, wherein at least a portion of the third radiation beam is spatially offset, angularly offset, or spatially and angularly offset from at least a portion of the second radiation beam; and
        one or more fourth optical components configured to combine at least a portion of the second radiation beam and at least a portion of the third radiation beam to form a first flood beam, wherein the one or more fourth optical components are further configured to direct at least a portion of the first flood beam towards the object; and
    the second detector configured to simultaneously record a first instance of a first superposition of a second intensity pattern of a second interference between at least a portion of the second radiation beam and at least a portion of a second return radiation from the object, and a third intensity pattern of a third interference between at least a portion of the third radiation beam and at least a portion of the second return radiation from the object, wherein the second detector is further configured to record ambient light reflected from a second scene, wherein the second detector is further configured to output a third signal with the recorded ambient light reflected from the second scene and a fourth signal with the recorded first superposition, wherein the processor is further communicatively coupled to the second detector and the second radiation source unit, and wherein the processor is further configured to receive the third signal and the fourth signal.

2. The system of claim 1, wherein the first return radiation from the object and the ambient light reflected from the first scene are focused first onto the first detector.

3. The system of claim 1, wherein the first return radiation from the object and the ambient light reflected from the first scene are not focused first onto a pupil plane.

4. The system of claim 1, wherein the processor is further configured to control the first radiation source unit in response to selecting the object in the first scene, and wherein the first radiation source unit is configured to locate and track the object.

5. The system of claim 1, wherein the processor is configured to select the object in the first scene prior to receiving the second signal, and configured to select another object in the first scene.

6. The system of claim 1, further comprising a user interface device communicatively coupled to the processor, wherein the user interface device is configured to receive the first signal, display the first scene using the first signal, and allow a user to select the object in the first scene.

7. A combined active and passive imaging system comprising:
   a first radiation source unit comprising:
      a first coherent radiation source configured to output a first radiation beam;
      a second coherent radiation source configured to output a second radiation beam;
      one or more first optical components configured to direct at least a portion of the first radiation beam and at least a portion of the second radiation beam towards a first detector, wherein at least a portion of the second radiation beam is spatially offset, angularly offset, or spatially and angularly offset from at least a portion of the first radiation beam; and
      one or more second optical components configured to combine at least a portion of the first radiation beam and at least a portion of the second radiation beam to form a first flood beam, wherein the one or more second optical components are further configured to direct the first flood beam towards an object in a first scene, wherein the first scene is larger than the object;
   the first detector configured to simultaneously record a first instance of a first superposition of a first intensity pattern of a first interference between at least a portion of the first radiation beam and at least a portion of a first return radiation from the object, and a second intensity pattern of a second interference between at least a portion of the second radiation beam and at least a portion of the first return radiation from the object, wherein the first detector is further configured to record ambient light reflected from the first scene, and wherein the first detector is further configured to output a first signal with the recorded ambient light reflected from the first scene and a second signal with the recorded first superposition; and
   a processor communicatively coupled to the first detector and the first radiation source unit, wherein the processor is configured to receive the first signal and the second signal, and wherein the processor is further configured to select the object in the first scene;
   a second radiation source unit comprising:
      a third coherent radiation source configured to output a third radiation beam;
      a fourth coherent radiation source configured to output a fourth radiation beam;
      one or more third optical components configured to direct at least a portion of the third radiation beam and at least a portion of the fourth radiation beam towards a second detector, wherein at least a portion of the fourth radiation beam is spatially offset, angularly offset, or spatially and angularly offset from at least a portion of the third radiation beam; and
      one or more fourth optical components configured to combine at least a portion of the third radiation beam and at least a portion of the fourth radiation beam to form a second flood beam, wherein the one or more fourth optical components are further configured to direct at least a portion of the second flood beam towards the object; and
   the second detector configured to simultaneously record a first instance of a second superposition of a third intensity pattern of a third interference between at least a portion of the third radiation beam and at least a portion of a second return radiation from the object, and a fourth intensity pattern of a fourth interference between at least a portion of the fourth radiation beam and at least a portion of the second return radiation from the object, wherein the second detector is further configured to record ambient light reflected from a second scene, wherein the second detector is further configured to output a third signal with the recorded ambient light reflected from the second scene and a fourth signal with the recorded second superposition, wherein the processor is further communicatively coupled to the second detector and the second radiation source unit, and wherein the processor is further configured to receive the third signal and the fourth signal.

8. The system of claim 7, wherein the first return radiation from the object and the ambient light reflected from the first scene are focused first onto the first detector.

9. The system of claim 7, wherein the first return radiation from the object and the ambient light reflected from the first scene are not focused first onto a pupil plane.

10. The system of claim 7, wherein the processor is further configured to control the first radiation source unit in response to selecting the object in the first scene, and wherein the first radiation source unit is configured to locate and track the object.

11. The system of claim 7, wherein the processor is configured to select the object in the first scene prior to receiving the second signal, and configured to select another object in the first scene.

12. The system of claim 7, further comprising a user interface device communicatively coupled to the processor, wherein the user interface device is configured to receive the first signal, display the first scene using the first signal, and allow a user to select the object in the first scene.

13. The system of claim 7, wherein the processor is further configured to determine the Fourier transform of the second signal, wherein the processor is further configured to extract a first complex-valued component object image and a second complex-valued component object image from the Fourier transform, and wherein the processor is further configured to determine a phase difference between at least a portion of the first complex-valued component object image and at least a portion of the second complex-valued component object image on a pixel-by-pixel basis and form at least one three-dimensional image from the determined phase difference.

14. The system of claim 7, wherein the processor is further configured to control the first radiation source unit and the second radiation source unit in response to selecting the object in the first scene, and wherein the first radiation source unit and the second radiation source unit are configured to locate and track the object.

15. The system of claim 7, further comprising a user interface device communicatively coupled to the processor, wherein the user interface device is configured to receive the first signal and the third signal, display the first scene using the first signal, display the second scene using the third signal, and allow a user to select the object.

* * * * *